(12) United States Patent
Xu et al.

(10) Patent No.: US 10,813,147 B2
(45) Date of Patent: Oct. 20, 2020

(54) DATA TRANSMISSION METHOD, TERMINAL, AND BASE STATION

(71) Applicant: Huawei Technologies Co., Ltd., Shenzhen, Guangdong (CN)

(72) Inventors: Xiaoying Xu, Shanghai (CN); Xiaoxiao Zheng, Shanghai (CN); Lingli Pang, Shanghai (CN); Li Yang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 194 days.

(21) Appl. No.: 15/795,050

(22) Filed: Oct. 26, 2017

(65) Prior Publication Data
US 2018/0049254 A1   Feb. 15, 2018

Related U.S. Application Data

(63) Continuation of application No. PCT/CN2015/092333, filed on Oct. 20, 2015.

(30) Foreign Application Priority Data

Apr. 27, 2015   (WO) ................. PCT/CN2015/077525

(51) Int. Cl.
*H04W 76/11* (2018.01)
*H04W 48/16* (2009.01)
(Continued)

(52) U.S. Cl.
CPC ............ *H04W 76/11* (2018.02); *H04W 48/00* (2013.01); *H04W 48/16* (2013.01);
(Continued)

(58) Field of Classification Search
None
See application file for complete search history.

(56) References Cited

U.S. PATENT DOCUMENTS

| | | | |
|---|---|---|---|
| 2009/0116434 A1* | 5/2009 | Lohr | H04L 5/0007 370/329 |
| 2011/0235605 A1 | 9/2011 | Yeoum et al. | |

(Continued)

FOREIGN PATENT DOCUMENTS

| | | |
|---|---|---|
| CN | 101814944 A | 8/2010 |
| CN | 102300331 A | 12/2011 |

(Continued)

OTHER PUBLICATIONS

"3rd Generation Partnership Project;Technical Specification Group Services and System Aspects;Study on Machine-Type Communications (MTC) and other mobile data applications communications enhancements(Release 12)" 3GPP TR 23.887 V12.0.0; Dec. 2013; 151 pages.

(Continued)

*Primary Examiner* — Xavier S Wong
(74) *Attorney, Agent, or Firm* — Fish & Richardson P.C.

(57) ABSTRACT

Embodiments of the present disclosure provide a data transmission method, terminal, and base station, relate to the communications field, and can improve data packet transmission efficiency. The data transmission method includes: receiving, by a terminal in an idle state, first resource sent from a base station, where the first resource is used by the terminal to send an uplink application layer data packet to the base station; and sending, by the terminal, on the first resource, the uplink application layer data packet to the base station. The data transmission method is applied to the data transmission system.

15 Claims, 13 Drawing Sheets

(51) Int. Cl.
*H04W 48/00* (2009.01)
*H04W 72/12* (2009.01)
*H04W 72/04* (2009.01)
*H04W 4/70* (2018.01)
*H04W 76/27* (2018.01)

(52) U.S. Cl.
CPC ..... *H04W 72/042* (2013.01); *H04W 72/0406* (2013.01); *H04W 72/1268* (2013.01); *H04W 4/70* (2018.02); *H04W 72/0453* (2013.01); *H04W 76/27* (2018.02)

(56) References Cited

U.S. PATENT DOCUMENTS

| | | | |
|---|---|---|---|
| 2013/0077484 A1 | 3/2013 | Zhao et al. | |
| 2013/0336234 A1* | 12/2013 | Ghosh | H04W 72/10 370/329 |
| 2014/0198672 A1* | 7/2014 | Koo | H04W 72/1215 370/252 |
| 2014/0233538 A1 | 8/2014 | Zhang et al. | |
| 2015/0023188 A1* | 1/2015 | Das | H04W 24/10 370/252 |
| 2015/0163730 A1* | 6/2015 | Zhang | H04W 48/16 370/329 |
| 2016/0081115 A1 | 3/2016 | Pang et al. | |
| 2016/0227459 A1* | 8/2016 | Fujishiro | H04W 76/27 |
| 2017/0034865 A1* | 2/2017 | Jung | H04W 76/10 |

FOREIGN PATENT DOCUMENTS

| | | |
|---|---|---|
| CN | 102387495 A | 3/2012 |
| CN | 102647801 A | 8/2012 |
| CN | 103517271 A | 1/2014 |
| CN | 103582145 A | 2/2014 |
| CN | 103716883 A | 4/2014 |
| CN | 104380765 A | 2/2015 |

OTHER PUBLICATIONS

Yuan Li, "Mobile Communication Principle and Equipment", Beijing University of Posts and Telecommunications Press, Jan. 31, 2009, 5 pages

* cited by examiner

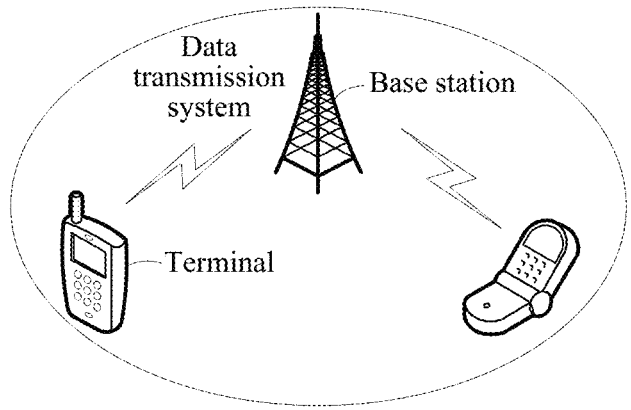

FIG. 1

| A terminal receives first resource sent from a base station, where the first resource is used by the terminal to send an uplink application layer data packet to the base station | ~ S101 |

| The terminal sends, on the first resource, the uplink application layer data packet to the base station | ~ S102 |

FIG. 2

| A base station sends first resource, where the first resource is used by a terminal to send an uplink application layer data packet to the base station | ~ S201 |

| The base station receives, on the first resource, the uplink application layer data packet sent by the terminal | ~ S202 |

FIG. 3

DATA TRANSMISSION METHOD, TERMINAL, AND BASE STATION

CROSS-REFERENCE TO RELATED APPLICATIONS

This application is a continuation of International Application No. PCT/CN2015/092333, filed on Oct. 20, 2015, which claims priority to Patent Application No. PCT/CN2015/077525, filed on Apr. 27, 2015. The disclosures of the aforementioned applications are hereby incorporated by reference in their entireties.

TECHNICAL FIELD

The present application relates to the communications field, and in particular, to a data transmission method, apparatus, and system.

BACKGROUND

With extensive application of a machine-to-machine (M2M) system, transmission of a small data packet including a small data amount is increasing. For example, when the M2M system is applied to smart metering, intelligent transportation, telehealth, and the like, data packets transmitted between a terminal and a base station are all small data packets.

Generally, in a Long Term Evolution (LTE) system, a terminal is usually in an idle (idle) state when there is no data to be transmitted, that is, no radio resource control (RRC) connection exists between the terminal and a base station. When the terminal in the idle state needs to transmit data, the terminal first needs to establish an RRC connection to the base station before the terminal sends a data packet to the base station. That is, the terminal switches from the idle state to a connected state. To save a transmission resource, the terminal releases the RRC connection between the terminal and the base station when the terminal has no data to be transmitted. That is, the terminal switches from the connected state to the idle state.

When the foregoing data transmission procedure is applied to the M2M system, a data packet that needs to be sent from the terminal is a small data packet, and there is a relatively large quantity of data packets. Therefore, the terminal needs to frequently establish an RRC connection to the base station and frequently release the RRC connection, resulting in relatively low efficiency of transmission of the small data packets.

SUMMARY

Embodiments of the present disclosure provide a data transmission method, apparatus, and system, and can improve data packet transmission efficiency.

To achieve the objective, the following technical solutions are used in the embodiments of the present disclosure.

According to a first aspect, an embodiment of the present disclosure provides a data transmission method, including:

receiving, by a terminal in an idle state, first resource sent from a base station, where the first resource is used by the terminal to send an uplink application layer data packet to the base station; and sending, by the terminal, on the first resource, the uplink application layer data packet to the base station.

In a first possible implementation of the first aspect, before the receiving, by a terminal in an idle state, first resource sent from a base station, the data transmission method further includes:

sending, by the terminal, on access resource, an access sequence to the base station, where the access resource is used to request the base station to allocate the first resource to the terminal; or the access sequence is used to request the base station to allocate the first resource to the terminal.

With reference to the first aspect or the first possible implementation of the first aspect, in a second possible implementation, after the sending, by the terminal, on the first resource, the uplink application layer data packet to the base station, the data transmission method further includes:

receiving, by the terminal, a downlink application layer data packet or downlink control information that is sent from the base station, where the downlink application layer data packet or the downlink control information includes an identifier of the terminal, and the identifier of the terminal is used to indicate that the base station successfully receives the uplink application layer data packet sent from the terminal; and determining, by the terminal according to the identifier of the terminal, whether the base station successfully receives the uplink application layer data packet sent from the terminal.

In a third possible implementation of the first aspect, the sending, by the terminal, on the first resource, the uplink application layer data packet to the base station includes:

when a amount of a to-be-sent data of the terminal is less than or equal to a first threshold, sending, by the terminal, on the first resource, the uplink application layer data packet to the base station; or when a sending interval between to-be-sent uplink application layer data packets of the terminal is greater than or equal to a second threshold, sending, by the terminal, on the first resource, the uplink application layer data packet to the base station.

With reference to the first possible implementation of the first aspect, in a fourth possible implementation, the sending, by the terminal, on access resource, an access sequence to the base station includes:

when a amount of a to-be-sent data of the terminal is less than or equal to a first threshold, sending, by the terminal, on the access resource, the access sequence to the base station; or when a sending interval between to-be-sent uplink application layer data packets of the terminal is greater than or equal to a second threshold, sending, by the terminal, on the access resource, the access sequence to the base station.

According to a second aspect, an embodiment of the present disclosure provides a data transmission method, including:

sending, by a base station, first resource, where the first resource is used by a terminal in an idle state to send an uplink application layer data packet to the base station; and receiving, by the base station, on the first resource, the uplink application layer data packet sent from the terminal.

In a first possible implementation of the second aspect, before the sending, by a base station, first resource, the data transmission method further includes:

receiving, by the base station, on access resource, an access sequence sent from the terminal, where the access resource is used to request the base station to allocate the first resource to the terminal, or the access sequence is used to request the base station to allocate the first resource to the terminal; and allocating, by the base station, the first resource to the terminal according to the access resource or the access sequence.

With reference to the second aspect or the first possible implementation of the second aspect, in a second possible implementation, after the receiving, by the base station, on the first resource, the uplink application layer data packet sent from the terminal, the data transmission method further includes:

sending, by the base station, a downlink application layer data packet or downlink control information to the terminal, where the downlink application layer data packet or the downlink control information includes an identifier of the terminal, and the identifier of the terminal is used to indicate that the base station successfully receives the uplink application layer data packet sent from the terminal.

According to a third aspect, an embodiment of the present disclosure provides a terminal, where the terminal is in an idle state, and the terminal includes:

a receiving unit, configured to receive first resource sent from a base station, where the first resource is used by the terminal to send an uplink application layer data packet to the base station; and a sending unit, configured to send, on the first resource received by the receiving unit, the uplink application layer data packet to the base station.

In a first possible implementation of the third aspect, the sending unit is further configured to: before the receiving unit receives the first resource sent from the base station, send, on access resource, an access sequence to the base station; where the access resource is used to request the base station to allocate the first resource to the terminal; or the access sequence is used to request the base station to allocate the first resource to the terminal.

With reference to the third aspect or the first possible implementation of the third aspect, in a second possible implementation, the terminal further includes a determining unit;

the receiving unit is further configured to: after the sending unit sends, on the first resource, the uplink application layer data packet to the base station, receive a downlink application layer data packet or downlink control information that is sent from the base station, where the downlink application layer data packet or the downlink control information includes an identifier of the terminal, and the identifier of the terminal is used to indicate that the base station successfully receives the uplink application layer data packet sent from the terminal; and the determining unit is configured to determine, according to the identifier of the terminal received by the receiving unit, whether the base station successfully receives the uplink application layer data packet sent from the terminal.

In a third possible implementation of the third aspect, the sending unit is specifically configured to: when a amount of a to-be-sent data of the terminal is less than or equal to a first threshold, send, on the first resource received by the receiving unit, the uplink application layer data packet to the base station; or when a sending interval between to-be-sent uplink application layer data packets of the terminal is greater than or equal to a second threshold, send, on the first resource received by the receiving unit, the uplink application layer data packet to the base station.

With reference to the first possible implementation of the third aspect, in a fourth possible implementation, the sending unit is specifically configured to: when a amount of a to-be-sent data of the terminal is less than or equal to a first threshold, send, on the access resource, the access sequence to the base station; or when a sending interval between to-be-sent uplink application layer data packets of the terminal is greater than or equal to a second threshold, send, on the access resource, the access sequence to the base station.

According to a fourth aspect, an embodiment of the present disclosure provides a base station, where the base station includes:

a sending unit, configured to send first resource, where the first resource is used by a terminal in an idle state to send an uplink application layer data packet to the base station; and a receiving unit, configured to receive, on the first resource sent from the sending unit, the uplink application layer data packet sent from the terminal.

In a first possible implementation of the fourth aspect, the base station further includes an allocation unit;

the receiving unit is further configured to: before the sending unit sends the first resource, receive, on access resource, an access sequence sent from the terminal, where the access resource is used to request the base station to allocate the first resource to the terminal, or the access sequence is used to request the base station to allocate the first resource to the terminal; and the allocation unit is configured to allocate the first resource to the terminal according to the access resource on which the receiving unit receives the access sequence or the access sequence received by the receiving unit.

With reference to the fourth aspect or the first possible implementation of the fourth aspect, in a second possible implementation, the sending unit is further configured to: after the receiving unit receives, on the first resource, the uplink application layer data packet sent from the terminal, send a downlink application layer data packet or downlink control information to the terminal, where the downlink application layer data packet or the downlink control information includes an identifier of the terminal, and the identifier of the terminal is used to indicate that the base station successfully receives the uplink application layer data packet sent from the terminal.

According to a fifth aspect, an embodiment of the present disclosure provides a terminal, where the terminal is in an idle state, and the terminal includes:

a receiver, configured to receive first resource sent from a base station, where the first resource is used by the terminal to send an uplink application layer data packet to the base station; and a transmitter, configured to send, on the first resource received by the receiver, the uplink application layer data packet to the base station.

In a first possible implementation of the fifth aspect, the transmitter is further configured to: before the receiver receives the first resource sent from the base station, send, on access resource, an access sequence to the base station; where the access resource is used to request the base station to allocate the first resource to the terminal; or the access sequence is used to request the base station to allocate the first resource to the terminal.

With reference to the fifth aspect or the first possible implementation of the fifth aspect, in a second possible implementation, the terminal further includes a processor;

the receiver is further configured to: after the transmitter sends, on the first resource, the uplink application layer data packet to the base station, receive a downlink application layer data packet or downlink control information that is sent from the base station, where the downlink application layer data packet or the downlink control information includes an identifier of the terminal, and the identifier of the terminal is used to indicate that the base station successfully receives the uplink application layer data packet sent from the terminal; and the processor is configured to determine, according to the identifier of the terminal received by the receiver, whether the base station successfully receives the uplink application layer data packet sent from the terminal.

In a third possible implementation of the fifth aspect, the transmitter is specifically configured to: when a amount of a to-be-sent data of the terminal is less than or equal to a first threshold, send, on the first resource received by the receiver, the uplink application layer data packet to the base station; or when a sending interval between to-be-sent uplink application layer data packets of the terminal is greater than or equal to a second threshold, send, on the first resource received by the receiver, the uplink application layer data packet to the base station.

With reference to the first possible implementation of the fifth aspect, in a fourth possible implementation, the transmitter is specifically configured to: when a amount of a to-be-sent data of the terminal is less than or equal to a first threshold, send, on the access resource, the access sequence to the base station; or when a sending interval between to-be-sent uplink application layer data packets of the terminal is greater than or equal to a second threshold, send, on the access resource, the access sequence to the base station.

According to a sixth aspect, an embodiment of the present disclosure provides a base station, where the base station includes:

a transmitter, configured to send first resource, where the first resource is used by a terminal in an idle state to send an uplink application layer data packet to the base station; and a receiver, configured to receive, on the first resource sent from the transmitter, the uplink application layer data packet sent from the terminal.

In a first possible implementation of the sixth aspect, the base station further includes a processor;

the receiver is further configured to: before the transmitter sends the first resource, receive, on access resource, an access sequence sent from the terminal, where the access resource is used to request the base station to allocate the first resource to the terminal, or the access sequence is used to request the base station to allocate the first resource to the terminal; and the processor is configured to allocate the first resource to the terminal according to the access resource on which the receiver receives the access sequence or the access sequence received by the receiver.

With reference to the sixth aspect or the first possible implementation of the sixth aspect, in a second possible implementation, the transmitter is further configured to: after the receiver receives, on the first resource, the uplink application layer data packet sent from the terminal, send a downlink application layer data packet or downlink control information to the terminal, where the downlink application layer data packet or the downlink control information includes an identifier of the terminal, and the identifier of the terminal is used to indicate that the base station successfully receives the uplink application layer data packet sent from the terminal.

The embodiments of the present disclosure provide a data transmission method, apparatus, and system. The method is: receiving, by a terminal in an idle state, first resource sent from a base station, where the first resource is used by the terminal to send an uplink application layer data packet to the base station; and sending, by the terminal, on the first resource, the uplink application layer data packet to the base station. Based on the foregoing technical solutions, when the terminal in the idle state needs to initiate data transmission, the terminal may send, on the first resource that is used to send the uplink application layer data packet and is sent from the base station, the uplink application layer data packet to the base station, thereby initiating data transmission. In the embodiments of the present disclosure, after the terminal initiates data transmission, unlike the prior art in which an RRC connection is frequently established and released during data transmission between the terminal and the base station, a data packet can be directly transmitted between the terminal and the base station, so that data packet transmission efficiency can be improved.

Optionally, in the first aspect to the sixth aspect, and implementations of the first aspect to the sixth aspect, the uplink application layer data packet may be replaced with an uplink signaling data packet, an uplink MAC layer control packet, or an uplink physical layer sequence; the downlink application layer data packet or the downlink control information may be replaced with a downlink signaling data packet a downlink MAC layer control packet; the uplink application layer data packet may be replaced with a first uplink signaling data packet, a first uplink MAC layer control packet, or a first uplink physical layer sequence; and the to-be-sent uplink application layer data packet may be replaced with a to-be-sent uplink signaling data packet, a to-be-sent uplink MAC layer control packet, or a to-be-sent uplink physical layer sequence.

Optionally, corresponding to the uplink application layer data packet sent from the terminal to the base station, the base station may send the downlink application layer data packet, the downlink control information, the downlink signaling data packet, or the downlink MAC layer control packet to the terminal to respond to the uplink application layer data packet. Preferably, the base station may send the downlink application layer data packet to the terminal to respond to the uplink application layer data packet.

Optionally, corresponding to the uplink signaling data packet sent from the terminal to the base station, the base station may send the downlink application layer data packet, the downlink control information, the downlink signaling data packet, or the downlink MAC layer control packet to the terminal to respond to the uplink signaling data packet. Preferably, the base station may send the downlink signaling data packet to the terminal to respond to the uplink signaling data packet.

Optionally, corresponding to the uplink MAC layer control packet sent from the terminal to the base station, the base station may send the downlink application layer data packet, the downlink control information, the downlink signaling data packet, or the downlink MAC layer control packet to the terminal to respond to the uplink MAC layer control packet. Preferably, the base station may send the downlink MAC layer control packet to the terminal to respond to the uplink MAC layer control packet.

Optionally, corresponding to the uplink physical layer sequence sent from the terminal to the base station, the base station may send the downlink application layer data packet, the downlink control information, the downlink signaling data packet, or the downlink MAC layer control packet to the terminal to respond to the uplink physical layer sequence. Preferably, the base station may send the downlink control information or the downlink MAC layer control packet to the terminal to respond to the uplink physical layer sequence.

The uplink signaling data packet may include an AS data packet or a NAS data packet. For example, the AS data packet as the uplink signaling data packet may be a cell change indication message or the like; the NAS data packet as the uplink signaling data packet may be a tracking area update message or the like. The uplink physical layer sequence may be shared by multiple terminals, or may be dedicated for each terminal, that is, each terminal has a dedicated uplink physical layer sequence.

The downlink signaling data packet may include an AS data packet or a NAS data packet. For example, the AS data packet as the downlink signaling data packet may be a cell change confirmation message or the like; the NAS data packet as the downlink signaling data packet may be a tracking area update confirmation message, a reconfiguration message, or the like.

Specifically, the base station may send the downlink MAC layer control packet to the terminal by using a physical downlink shared channel.

According to the data transmission method in the embodiments of the present disclosure, because multiple types of data packets (for example, an application layer data packet, a signaling data packet, a MAC layer control packet, and a physical layer sequence) can be transmitted between a terminal in an idle state and a base station, the terminal can more easily and flexibly initiate data transmission. Therefore, a data packet can be directly transmitted between the terminal and the base station more easily and flexibly, and data packet transmission efficiency is improved.

According to a seventh aspect, an embodiment of the present disclosure provides a data transmission method, including:

receiving, by a terminal in an idle state, downlink control information sent from a base station, where the downlink control information includes a data transmission indication, and the data transmission indication is used to instruct the terminal to receive a downlink application layer data packet sent from the base station; and receiving, by the terminal according to the data transmission indication, the downlink application layer data packet sent from the base station.

In a first possible implementation of the seventh aspect, before the receiving, by a terminal in an idle state, downlink control information sent from a base station, the data transmission method further includes:

obtaining, by the terminal, an identifier of the terminal, where the identifier of the terminal is used by the terminal to determine a receiving occasion of receiving the downlink control information, and the identifier of the terminal is at least one of a cell radio network temporary identifier of the terminal or an Internet Protocol address of the terminal; and determining, by the terminal, the receiving occasion according to the identifier of the terminal; where the receiving, by a terminal in an idle state, downlink control information sent from a base station includes:

receiving, by the terminal, on the receiving occasion, the downlink control information sent from the base station.

With reference to the first possible implementation of the seventh aspect, in a second possible implementation, after the obtaining, by the terminal, an identifier of the terminal, before the receiving, by a terminal in an idle state, downlink control information sent from a base station, the data transmission method further includes:

sending, by the terminal, the identifier of the terminal to the base station, where the identifier of the terminal is used by the base station to determine a sending occasion of sending the downlink control information.

According to an eighth aspect, an embodiment of the present disclosure provides a data transmission method, including:

sending, by a base station, downlink control information to a terminal in an idle state, where the downlink control information includes a data transmission indication, and the data transmission indication is used to instruct the terminal to receive a downlink application layer data packet sent from the base station; and sending, by the base station, the downlink application layer data packet to the terminal.

In a first possible implementation of the eighth aspect, before the sending, by a base station, downlink control information to a terminal in an idle state, the data transmission method further includes:

receiving, by the base station, an identifier of the terminal sent from the terminal, where the identifier of the terminal is used by the base station to determine a sending occasion of sending the downlink control information, and the identifier of the terminal is at least one of a cell radio network temporary identifier of the terminal or an Internet Protocol address of the terminal; and determining, by the base station, the sending occasion according to the identifier of the terminal; where the sending, by a base station, downlink control information to a terminal in an idle state includes:

sending, by the base station, on the sending occasion, the downlink control information to the terminal.

According to a ninth aspect, an embodiment of the present disclosure provides a terminal, where the terminal is in an idle state, and the terminal includes:

a receiving unit, configured to: receive downlink control information sent from a base station, where the downlink control information includes a data transmission indication, and the data transmission indication is used to instruct the terminal to receive a downlink application layer data packet sent from the base station; and receive, according to the data transmission indication, the downlink application layer data packet sent from the base station.

In a first possible implementation of the ninth aspect, the terminal further includes an obtaining unit and a determining unit;

the obtaining unit is configured to obtain an identifier of the terminal before the receiving unit receives the downlink control information sent from the base station, where the identifier of the terminal is used to determine a receiving occasion of receiving the downlink control information, and the identifier of the terminal is at least one of a cell radio network temporary identifier of the terminal or an Internet Protocol address of the terminal;

the determining unit is configured to determine the receiving occasion according to the identifier of the terminal obtained by the obtaining unit; and the receiving unit is specifically configured to receive, on the receiving occasion determined by the determining unit, the downlink control information sent from the base station.

With reference to the first possible implementation of the ninth aspect, in a second possible implementation, the terminal further includes a sending unit;

the sending unit is configured to: after the obtaining unit obtains the identifier of the terminal, before the receiving unit receives the downlink control information sent from the base station, send the identifier of the terminal obtained by the obtaining unit to the base station, where the identifier of the terminal is used by the base station to determine a sending occasion of sending the downlink control information.

According to a tenth aspect, an embodiment of the present disclosure provides a base station, where the base station includes:

a sending unit, configured to: send downlink control information to a terminal in an idle state, where the downlink control information includes a data transmission indication, and the data transmission indication is used to instruct the terminal to receive a downlink application layer data packet sent from the base station; and send the downlink application layer data packet to the terminal.

In a first possible implementation of the tenth aspect, the base station further includes a receiving unit and a determining unit;

the receiving unit is configured to: before the sending unit sends the downlink control information to the terminal, receive an identifier of the terminal sent from the terminal, where the identifier of the terminal is used to determine a sending occasion of sending the downlink control information, and the identifier of the terminal is at least one of a cell radio network temporary identifier of the terminal or an Internet Protocol address of the terminal;

the determining unit is configured to determine the sending occasion according to the identifier of the terminal received by the receiving unit; and the sending unit is specifically configured to send, on the sending occasion determined by the determining unit, the downlink control information to the terminal.

According to an eleventh aspect, an embodiment of the present disclosure provides a terminal, where the terminal is in an idle state, and the terminal includes:

a receiver, configured to: receive downlink control information sent from a base station, where the downlink control information includes a data transmission indication, and the data transmission indication is used to instruct the terminal to receive a downlink application layer data packet sent from the base station; and receive, according to the data transmission indication, the downlink application layer data packet sent from the base station.

In a first possible implementation of the eleventh aspect, the terminal further includes a processor;

the processor is configured to: obtain an identifier of the terminal before the receiver receives the downlink control information sent from the base station, and determine a receiving occasion of receiving the downlink control information according to the identifier of the terminal, where the identifier of the terminal is used to determine the receiving occasion, and the identifier of the terminal is at least one of a cell radio network temporary identifier of the terminal or an Internet Protocol address of the terminal; and the receiver is specifically configured to receive, on the receiving occasion determined by the processor, the downlink control information sent from the base station.

With reference to the first possible implementation of the eleventh aspect, in a second possible implementation, the terminal further includes a transmitter;

the transmitter is configured to: after the processor obtains the identifier of the terminal, before the receiver receives the downlink control information sent from the base station, send the identifier of the terminal obtained by the processor to the base station, where the identifier of the terminal is used by the base station to determine a sending occasion of sending the downlink control information.

According to a twelfth aspect, an embodiment of the present disclosure provides a base station, where the base station includes:

a transmitter, configured to: send downlink control information to a terminal in an idle state, where the downlink control information includes a data transmission indication, and the data transmission indication is used to instruct the terminal to receive a downlink application layer data packet sent from the base station; and send the downlink application layer data packet to the terminal.

In a first possible implementation of the twelfth aspect, the base station further includes a receiver and a processor;

the receiver is configured to: before the transmitter sends the downlink control information to the terminal, receive an identifier of the terminal sent from the terminal, where the identifier of the terminal is used to determine a sending occasion of sending the downlink control information, and the identifier of the terminal is at least one of a cell radio network temporary identifier of the terminal or an Internet Protocol address of the terminal;

the processor is configured to determine the sending occasion according to the identifier of the terminal received by the receiver; and the transmitter is specifically configured to send, on the sending occasion determined by the processor, the downlink control information to the terminal.

Optionally, in the seventh aspect to the twelfth aspect, and implementations of the seventh aspect to the twelfth aspect, the downlink application layer data packet may be replaced with a downlink signaling data packet, a downlink MAC layer control packet, or a downlink physical layer sequence.

The downlink signaling data packet may include an AS data packet or a NAS data packet. For example, the AS data packet may be a cell change confirmation message or the like; the NAS data packet may be a tracking area update confirmation message or a reconfiguration message or the like. The downlink physical layer sequence may be shared by multiple terminals, or may be dedicated for each terminal, that is, each terminal has a dedicated downlink physical layer sequence.

Specifically, the base station may send the downlink MAC layer control packet to the terminal by using a physical downlink shared channel.

According to the data transmission method in the embodiments of the present disclosure, because multiple types of data packets (for example, an application layer data packet, a signaling data packet, a MAC layer control packet, and a physical layer sequence) can be transmitted between a terminal in an idle state and a base station, the terminal can more easily and flexibly initiate data transmission. Therefore, a data packet can be directly transmitted between the terminal and the base station more easily and flexibly, and data packet transmission efficiency is improved.

According to a thirteenth aspect, an embodiment of the present disclosure provides a data transmission system, and the data transmission system includes:

the terminal according to the third aspect and the base station according to the fourth aspect; or the terminal according to the fifth aspect and the base station according to the sixth aspect; or the terminal according to the ninth aspect and the base station according to the tenth aspect; or the terminal according to the eleventh aspect and the base station according to the twelfth aspect.

The embodiments of the present disclosure provide a data transmission method, apparatus, and system. The method is: receiving, by a terminal in an idle state, downlink control information sent from a base station, where the downlink control information includes a data transmission indication, and the data transmission indication is used to instruct the terminal to receive a downlink application layer data packet sent from the base station; and receiving, by the terminal according to the data transmission indication, the downlink application layer data packet sent from the base station. Based on the foregoing technical solutions, the base station can instruct, according to the data transmission indication, the terminal in the idle state to receive the downlink application layer data packet sent from the base station. Therefore, the terminal can directly receive, according to the data transmission indication, the downlink application layer data packet sent from the base station, thereby initiating data transmission. In the embodiments of the present disclosure, after the terminal initiates data transmission, unlike the prior art in which an RRC connection is frequently established and released during data transmission between the terminal and the base station, a data packet can be directly transmitted between the terminal and the base station, so that data packet transmission efficiency can be improved.

BRIEF DESCRIPTION OF THE DRAWINGS

To describe the technical solutions in the embodiments of the present disclosure more clearly, the following briefly describes the accompanying drawings required for describing the embodiments or the prior art. Apparently, the accompanying drawings in the following description show merely some embodiments of the present disclosure, and a person of ordinary skill in the art may still derive other drawings from these accompanying drawings without creative efforts.

FIG. 1 is a schematic diagram of a data transmission system according to an embodiment of the present disclosure;

FIG. 2 is a flowchart 1 of a data transmission method according to an embodiment of the present disclosure;

FIG. 3 is a flowchart 2 of a data transmission method according to an embodiment of the present disclosure;

DETAILED DESCRIPTION

Figure 4:
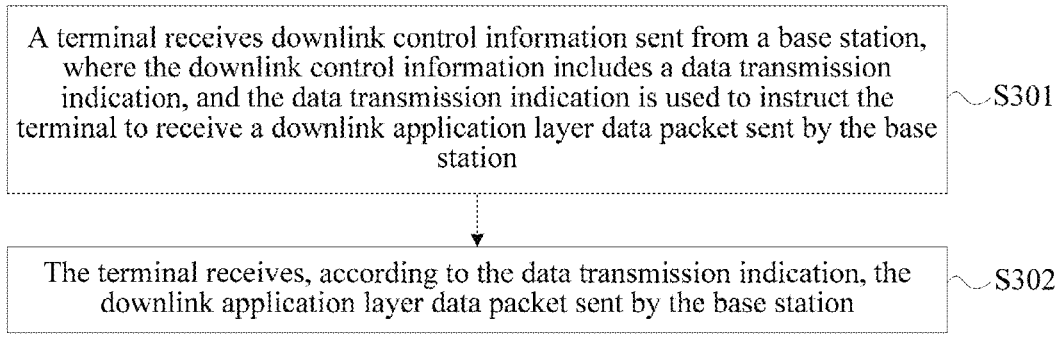
FIG. 4 is a flowchart 3 of a data transmission method according to an embodiment of the present disclosure.

The following clearly describes the technical solutions in the embodiments of the present disclosure with reference to the accompanying drawings in the embodiments of the present disclosure. Apparently, the described embodiments are merely some but not all of the embodiments of the present disclosure.

A data transmission method, apparatus, and system that are provided in the embodiments of the present disclosure may be applied to a data transmission system in which data transmission needs to be performed between a terminal in an idle state and a base station. For example, the data transmission system may be an M2M system. In the embodiments of the present disclosure, when transmitting data to the base station, the terminal in the idle state does not need to establish an RRC connection, but can directly transmit a data packet.

It should be noted that, the idle state in the embodiments of the present disclosure may be understood as a state in which no RRC connection is established between the terminal and the base station; or the idle state may be understood as a specific state of the terminal in a general sense, that is, no RRC connection is established between the terminal and the base station in the specific state, but the terminal obtains some access stratum resources, for example, obtains an access stratum identifier that is allocated by the base station to the terminal; or the idle state may be understood as a state in which there is no data sending resource dedicated for the terminal between the terminal and the base station; or the idle state may be understood as a state in which the terminal has not performed data transmission for a long time (for example, a few dozen minutes, several hours, or even several days) since data transmission was performed between the terminal and the base station, and the state may also be referred to as an inactive state.

Optionally, the idle state may be understood as a power saving state in which the terminal does not perform downlink pilot measurement; or the idle state may be understood as a state in which the terminal has a unique air interface identifier shared in an area of multiple cells, for example, a state in which the terminal has a unique radio network temporary identifier (RNTI) shared in an area of multiple cells. For ease of the following description, the unique RNTI of the terminal shared in the area of the multiple cells may be represented as an X-RNTI.

In particular, the directly transmitted data packet may be a data packet generated at an application layer, which is referred to as an application layer data packet, for example, an Internet Protocol (IP) data packet.

Optionally, the directly transmitted data packet may be a signaling data packet, a Media Access Control (MAC) layer control packet, or a physical layer sequence. The signaling data packet may include an access stratum (AS) data packet or a non-access stratum (NAS) data packet.

FIG. 1 is an architecture diagram of a data transmission system according to an embodiment of the present disclosure. In the data transmission system, an application layer data packet transmitted between a terminal and a base station is generally an application layer data packet with a relatively small data amount or a relatively large sending interval ("relatively small data amount" may be understood as a amount of a to-be-sent data of the terminal being less than or equal to a first threshold, and "relatively large sending interval" may be understood as a sending interval between to-be-sent uplink application layer data packets of the terminal being greater than or equal to a second threshold). According to a data transmission method in the prior art, to save an air interface resource between a terminal and a base station, the terminal is generally in an idle state (that is, an RRC connection established by the terminal in a connected state is released) when there is no data to be transmitted. When the terminal in the idle state has data to be transmitted, the terminal first initiates an RRC connection, so that the terminal establishes the RRC connection to the base station, that is, the terminal can transmit data to the base station only after the terminal switches from the idle state to the connected state. When the terminal in the connected state has no data to be transmitted within a time period, the terminal releases the RRC connection between the terminal and the base station, that is, the terminal switches from the connected state to the idle state. Therefore, when the terminal needs to send an application layer data packet with a relatively small data amount or with a relatively large sending interval, the terminal needs to frequently establish an RRC connection to the base station and frequently release the RRC connection. That is, when the terminal in the idle state needs to send an application layer data packet, the terminal first needs to establish an RRC connection to the base station, and then can transmit the application layer data packet, resulting in low data packet transmission efficiency.

According to the data transmission method provided in the embodiments of the present disclosure, an application layer data packet can be directly transmitted between a terminal in an idle state and a base station without a need to establish an RRC connection, so that data packet transmission efficiency can be improved.

The data transmission method, apparatus, and system provided in the embodiments of the present disclosure are described below in detail with reference to the accompanying drawings. A terminal in all data transmission methods provided in the embodiments of the present disclosure is a terminal in an idle state. For ease of description, a limitation of "being in an idle state" is omitted for a terminal in the following embodiments, especially in steps of the methods. However, a terminal mentioned in all the following embodiments is a terminal in an idle state regardless of whether it is clearly specified that the terminal is a terminal in an idle state.

Embodiment 1

As shown in FIG. 2, an embodiment of the present disclosure provides a data transmission method, and the data transmission method may include the following steps.

S101. A terminal receives first resource sent from a base station, where the first resource is used by the terminal to send an uplink application layer data packet to the base station.

S102. The terminal sends, on the first resource, the uplink application layer data packet to the base station.

In the data transmission method provided in this embodiment of the present disclosure, because the first resource is used by a terminal in an idle state to send the uplink application layer data packet to the base station, after the terminal in the idle state receives the first resource sent from the base station, the terminal may directly send, on the first resource, the uplink application layer data packet to the base station, that is, the base station may receive, on the first resource, the uplink application layer data packet sent from the terminal. The uplink application layer data packet may be user data that needs to be sent from the terminal to the base station, for example, an uplink IP data packet.

Optionally, the first resource may be broadcast by the base station by using a system broadcast message, or may be sent to the terminal by the base station by using a dedicated message. This is not specifically limited in the present disclosure.

Optionally, the first resource may be defined in a protocol.

Optionally, there may be multiple pieces of first resource. In this way, it can be ensured that a majority of multiple terminals in an idle state can successfully send an uplink application layer data packet to the base station.

Further, when there are multiple pieces of first resource, the terminal first needs to select one piece of first resource from the multiple pieces of first resource before step S102. Correspondingly, in step S102, the terminal sends, on the selected one piece of first resource, the uplink application layer data packet to the base station.

Specifically, the terminal may select one piece of first resource from multiple pieces of first resource in a random selection manner; or the terminal may select one piece of first resource from multiple pieces of first resource according to an identifier of the terminal; or the terminal may select one piece of first resource from multiple pieces of first resource according to a group allocated by the base station to the terminal; or the terminal may select one piece of first resource from multiple pieces of first resource in another manner, for example, the terminal may select one piece of first resource from multiple pieces of first resource according to a amount of a to-be-sent data of the terminal. A specific selection manner is not limited in the present disclosure.

For example, a method for selecting, by the terminal, one piece of first resource from multiple pieces of first resource according to an identifier of the terminal is as follows: Assuming that the identifier of the terminal is A, the terminal may use A modulo a number (the number may be selected according to an actual situation, for example, may be B, and the terminal may use A % B), and select, from the multiple pieces of first resource according to a result of the modulo operation, one piece of first resource whose resource identifier is same as the result.

A method for selecting, by the terminal, one piece of first resource from multiple pieces of resource information according to a group allocated by the base station to the terminal is as follows: Assuming that the base station divides all terminals into three groups, and also divides the multiple pieces of first resource into three groups, if the terminal is in a first group, the terminal may select one piece of first resource in the first group from the three groups of first resource.

Optionally, the terminal may obtain, from a system broadcast message broadcast by the base station, configuration information of an uplink channel for sending an uplink application layer data packet; or the terminal may obtain, from a system broadcast message broadcast by the base station, configuration information of a downlink channel for receiving a downlink application layer data packet.

Optionally, the first resource may be time-frequency resource information, for example, time domain resource information and frequency domain resource information; or the first resource may be time resource information, for example, a frame number and a subframe number. Specifically, the first resource may be designed according to an actual use requirement, and is not limited in the present disclosure.

This embodiment of the present disclosure provides a data transmission method. The method is: receiving, by a terminal in an idle state, first resource sent from a base station, where the first resource is used by the terminal to send an uplink application layer data packet to the base station; and sending, by the terminal, on the first resource, the uplink application layer data packet to the base station. Based on the foregoing technical solution, when the terminal in the idle state needs to initiate data transmission, the terminal may send, on the first resource that is used to send the uplink application layer data packet and is sent from the base station, the uplink application layer data packet to the base station, thereby initiating data transmission. In this embodiment of the present disclosure, after the terminal initiates data transmission, unlike the prior art in which an RRC connection is frequently established and released during data transmission between the terminal and the base station, a data packet can be directly transmitted between the terminal and the base station, so that data packet transmission efficiency can be improved.

Optionally, in the foregoing embodiment shown in FIG. 2, the dedicated message may be a dedicated higher layer message or physical layer scheduling signaling. That is, the first resource is sent to the terminal by the base station by using the dedicated higher layer message or the physical layer scheduling signaling.

As shown in FIG. 3, an embodiment of the present disclosure provides a data transmission method, and the data transmission method may include the following steps.

S201. A base station sends first resource, where the first resource is used by a terminal to send an uplink application layer data packet to the base station.

S202. The base station receives, on the first resource, the uplink application layer data packet sent from the terminal.

After the base station sends the first resource that is used by a terminal in an idle state to send an uplink application layer data packet, if a terminal in an idle state needs to send an uplink application layer data packet to the base station, the terminal may send, on the first resource, the uplink application layer data packet to the base station.

It should be noted that, for detailed descriptions of the first resource and the uplink application layer data packet, refer to the related descriptions of the first resource and the uplink application layer data packet in the embodiment shown in FIG. 2, and details are not described herein.

This embodiment of the present disclosure provides a data transmission method. The method is: sending, by a base station, first resource, where the first resource is used by a terminal in an idle state to send an uplink application layer data packet to the base station; and receiving, by the base station, on the first resource, the uplink application layer data packet sent from the terminal. Based on the foregoing technical solution, when the terminal in the idle state needs to initiate data transmission, the terminal may send, on the first resource that is used to send the uplink application layer data packet and is sent from the base station, the uplink application layer data packet to the base station, thereby initiating data transmission. In this embodiment of the present disclosure, after the terminal initiates data transmission, unlike the prior art in which an RRC connection is frequently established and released during data transmission between the terminal and the base station, a data packet can be directly transmitted between the terminal and the base station, so that data packet transmission efficiency can be improved.

Optionally, in the embodiments shown in FIG. 2 and FIG. 3, the uplink application layer data packet may be replaced with an uplink signaling data packet, an uplink MAC layer control packet, or an uplink physical layer sequence. For detailed descriptions and examples of the uplink application layer data packet, the uplink signaling data packet, the uplink MAC layer control packet, and the uplink physical layer sequence, refer to the related descriptions in the SUMMARY part (for details, refer to the related descriptions in some optional manners before the seventh aspect of the SUMMARY part), and details are not described herein.

Optionally, in this embodiment of the present disclosure, the terminal may indicate, by using information such as a logical channel and/or a destination address of a data packet that needs to be sent, a destination network node of the data packet that is to be forwarded by the base station. The destination network node may be a base station control node or a core network node.

Optionally, in this embodiment of the present disclosure, any one of the base station, the base station control node, or the core network node can allocate a NAS user temporary identifier to the terminal.

According to the data transmission method in this embodiment of the present disclosure, because multiple types of data packets (for example, an application layer data packet, a signaling data packet, a MAC layer control packet, and a physical layer sequence) can be transmitted between a terminal in an idle state and a base station, the terminal can more easily and flexibly initiate data transmission. Therefore, a data packet can be directly transmitted between the terminal and the base station more easily and flexibly, and data packet transmission efficiency is improved.

As shown in FIG. 4, an embodiment of the present disclosure provides a data transmission method, and the data transmission method may include the following steps.

S301. A terminal receives downlink control information sent from a base station, where the downlink control information includes a data transmission indication, and the data transmission indication is used to instruct the terminal to receive a downlink application layer data packet sent from the base station.

S302. The terminal receives, according to the data transmission indication, the downlink application layer data packet sent from the base station.

In the data transmission method provided in this embodiment of the present disclosure, a terminal in an idle state may receive, according to the data transmission indication in the downlink control information sent from the base station, the downlink application layer data packet sent from the base station. Specifically, after the terminal in the idle state receives the downlink control information sent from the base station, the terminal determines, according to the data transmission indication in the downlink control information, that the base station instructs the terminal to receive the downlink application layer data packet sent from the base station. Therefore, the terminal can receive, according to the data transmission indication and on a resource indicated by the downlink control information, the downlink application layer data packet sent from the base station, that is, data transmission can be directly performed between the terminal and the base station.

Specifically, the base station may send the downlink control information to the terminal by using a physical downlink control channel (PDCCH), so that the terminal may also receive, by listening on the PDCCH, the downlink control information sent from the base station.

This embodiment of the present disclosure provides a data transmission method. The method is: receiving, by a terminal in an idle state, downlink control information sent from a base station, where the downlink control information includes a data transmission indication, and the data transmission indication is used to instruct the terminal to receive a downlink application layer data packet sent from the base station; and receiving, by the terminal according to the data transmission indication, the downlink application layer data packet sent from the base station. Based on the foregoing technical solution, the base station can instruct, according to the data transmission indication, the terminal in the idle state to receive the downlink application layer data packet sent from the base station. Therefore, the terminal can directly receive, according to the data transmission indication, the downlink application layer data packet sent from the base station, thereby initiating data transmission. In this embodiment of the present disclosure, after the terminal initiates data transmission, unlike the prior art in which an RRC connection is frequently established and released during data transmission between the terminal and the base station, a data packet can be directly transmitted between the terminal and the base station, so that data packet transmission efficiency can be improved.

Figure 5:
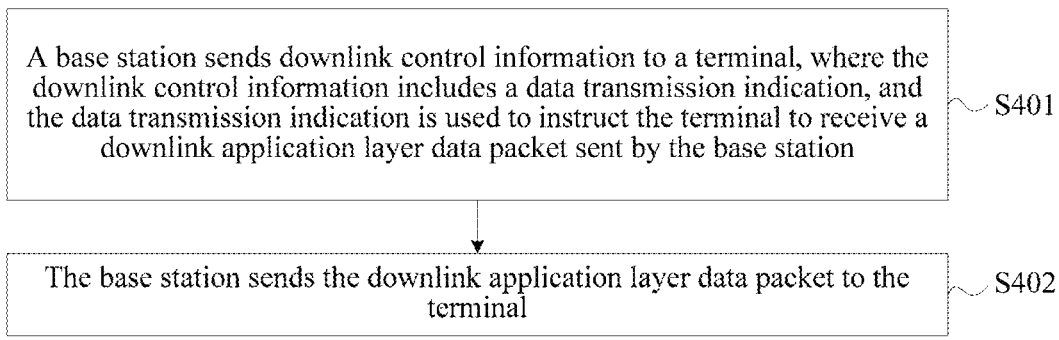
FIG. 5 is a flowchart 4 of a data transmission method according to an embodiment of the present disclosure.

As shown in FIG. 5, an embodiment of the present disclosure provides a data transmission method, and the data transmission method may include the following steps.

S401. A base station sends downlink control information to a terminal, where the downlink control information includes a data transmission indication, and the data transmission indication is used to instruct the terminal to receive a downlink application layer data packet sent from the base station.

S402. The base station sends the downlink application layer data packet to the terminal.

In the data transmission method provided in this embodiment of the present disclosure, when the base station needs to send the downlink application layer data packet to a terminal in an idle state, the base station may send, on a PDCCH, the downlink control information to the terminal. The downlink control information includes the data transmission indication that is used to instruct the terminal to receive the downlink application layer data packet sent from the base station, so that the terminal can receive, according to the data transmission indication, the downlink application layer data packet sent from the base station, that is, data transmission can be directly performed between the terminal and the base station.

Specifically, the base station may send the downlink control information to the terminal by using the PDCCH, so that the terminal may also receive, by listening on the PDCCH, the downlink control information sent from the base station.

This embodiment of the present disclosure provides a data transmission method. The method is: sending, by a base station, downlink control information to a terminal in an idle state, where the downlink control information includes a data transmission indication, and the data transmission indication is used to instruct the terminal to receive a downlink application layer data packet sent from the base station; and sending, by the base station, the downlink application layer data packet to the terminal. Based on the foregoing technical solution, the base station can instruct, according to the data transmission indication, the terminal in the idle state to receive the downlink application layer data packet sent from the base station. Therefore, the terminal can directly receive, according to the data transmission indication, the downlink application layer data packet sent from the base station, thereby initiating data transmission. In this embodiment of the present disclosure, after the terminal initiates data transmission, unlike the prior art in which an RRC connection is frequently established and released during data transmission between the terminal and the base station, a data packet can be directly transmitted between the terminal and the base station, so that data packet transmission efficiency can be improved.

Optionally, the downlink control channel in the embodiments shown in FIG. 4 and FIG. 5 may be a channel different from a PDCCH in the prior art. For example, the downlink control information (referred to as first downlink control information) is sent from using another segment of resource. The another segment of resource is the downlink control channel, and the first downlink control information occupies fewer bits than the downlink control information in the prior art (that is, content of the first downlink control information is less than content of the downlink control information in the prior art). For example, the first downlink control information includes only an identifier of the terminal and/or radio resource information of a downlink data channel.

Optionally, in the embodiments shown in FIG. 4 and FIG. 5, the downlink application layer data packet may be replaced with a downlink signaling data packet, a downlink MAC layer control packet, or a downlink physical layer sequence. For detailed descriptions and examples of the downlink application layer data packet, the downlink signaling data packet, the downlink MAC layer control packet, and the downlink physical layer sequence, refer to the related descriptions in the SUMMARY part (for details, refer to the related descriptions in some optional manners after the seventh aspect and before the thirteenth aspect of the SUMMARY part), and details are not described herein.

According to the data transmission method in this embodiment of the present disclosure, because multiple types of data packets (for example, an application layer data packet, a signaling data packet, a MAC layer control packet, and a physical layer sequence) can be transmitted between a terminal in an idle state and a base station, the terminal can more easily and flexibly initiate data transmission. Therefore, a data packet can be directly transmitted between the terminal and the base station more easily and flexibly, and data packet transmission efficiency is improved.

Embodiment 2

For a data transmission method provided in this embodiment of the present disclosure, in a possible implementation, a terminal does not need to access a base station, that is, the terminal does not need to request the base station to allocate, to the terminal, first resource for sending an uplink application layer data packet, and the base station can directly allocate the first resource to the terminal, so that the terminal can send, on the first resource, the uplink application layer data packet to the base station. In another possible implementation, a terminal needs to first access a base station, that is, the terminal needs to first request, from the base station, first resource for sending an uplink application layer data packet, and then the base station can allocate the first resource to the terminal, so that the terminal can send, on the first resource, the uplink application layer data packet to the base station.

For a better understanding of the data transmission method provided in this embodiment of the present disclosure, the data transmission method provided in this embodiment of the present disclosure is described in detail below by using the foregoing two possible implementations separately as an example.

A possible implementation: a terminal does not need to access a base station.

Figure 6:
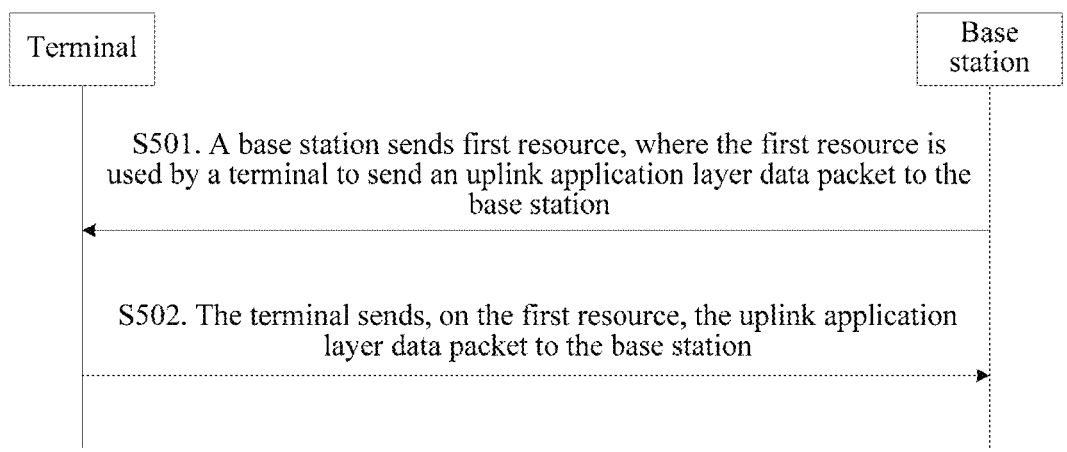
FIG. 6 is an interworking diagram 1 of a data transmission method according to an embodiment of the present disclosure.

As shown in FIG. 6, an embodiment of the present disclosure provides a data transmission method, and the data transmission method may include the following steps.

S501. A base station sends first resource, where the first resource is used by a terminal to send an uplink application layer data packet to the base station.

S502. The terminal sends, on the first resource, the uplink application layer data packet to the base station.

In the data transmission method provided in this embodiment of the present disclosure, because the first resource is used by a terminal in an idle state to send the uplink application layer data packet to the base station, after the terminal in the idle state receives the first resource sent from the base station, the terminal may directly send, on the first resource, the uplink application layer data packet to the base station, that is, the base station may receive, on the first resource, the uplink application layer data packet sent from the terminal. The uplink application layer data packet may be user data that needs to be sent from the terminal to the base station, for example, an uplink IP data packet.

Optionally, the base station may respond to the terminal by receiving or refusing to receive the uplink application layer data packet sent from the terminal. If the base station receives the uplink application layer data packet sent from the terminal, data transmission may be directly performed between the base station and the terminal. If the base station refuses to receive the uplink application layer data packet sent from the terminal, the base station may instruct the terminal to initiate an RRC connection establishment process and transmit data in a data transmission manner in the prior art after an RRC connection is established. Details are not described herein.

Optionally, if the base station receives the uplink application layer data packet sent from the terminal, the base station may further allocate an identifier to the terminal, and instruct the terminal to store the identifier. The identifier may be a cell-level identifier of the terminal, for example, may be a cell radio network temporary identifier (C-RNTI) of the terminal. The identifier may be used by the base station to send a downlink application layer data packet to the terminal.

When the terminal has stored a C-RNTI of the terminal, if the base station allocates a new C-RNTI to the terminal, the terminal may update the C-RNTI stored in the terminal.

For example, after a terminal camps on a cell for the first time or performs cell reselection, the terminal may instruct a base station that serves the terminal to allocate a new C-RNTI to the terminal. After the terminal receives the new C-RNTI allocated by the base station to the terminal, the terminal stores the new C-RNTI or uses the new C-RNTI to cover an old C-RNTI (the old C-RNTI may be understood as a C-RNTI stored before the terminal receives the new C-RNTI), and the terminal may instruct the base station that originally serves the terminal to release the old C-RNTI.

A method for instructing, by the terminal, the base station that originally serves the terminal to release the old C-RNTI may be: The terminal may periodically send an on-network indication message to the base station. The on-network indication message is used to indicate that the terminal is within a coverage area of the base station. If the base station does not receive, within a preset time, for example, 24 hours, the on-network indication message sent from the terminal, the base station may consider that the terminal is already out of the coverage area of the base station, so that the base station may release the C-RNTI allocated by the base station to the terminal.

In step S502, when the terminal sends, on the first resource, the uplink application layer data packet to the base station, the uplink application layer data packet may carry an IP address of the terminal, a C-RNTI of the terminal, or another identifier of the terminal. The another identifier of the terminal may be a unique identifier allocated by a core network device to the terminal, for example, a system architecture evolution temporary mobile subscriber identity (S-TMSI) of the terminal. Alternatively, the terminal may add an IP address of the terminal, a C-RNTI of the terminal, or another identifier of the terminal into a Media Access Control (MAC) header of the uplink application layer data packet. Specifically, this is not limited in the present disclosure. The uplink application layer data packet may be an uplink IP data packet.

Further, when the uplink application layer data packet or the MAC header of the uplink application layer data packet carries the IP address of the terminal, or the uplink application layer data packet or the MAC header of the uplink application layer data packet carries the another identifier of the terminal, after the base station receives the uplink application layer data packet sent from the terminal, the base station may establish a correspondence between the identifier allocated by the base station to the terminal and the identifier of the terminal carried in the uplink application layer data packet, so that when sending the downlink application layer data packet to the terminal, the base station can accurately send the downlink application layer data packet to the terminal.

For example, if the identifier allocated by the base station to the terminal is the C-RNTI of the terminal, and the identifier of the terminal carried in the uplink application layer data packet is the IP address of the terminal or the S-TMSI of the terminal, after the base station receives the uplink application layer data packet, the base station may establish a correspondence between the C-RNTI of the terminal and the IP address of the terminal, or establish a correspondence between the C-RNTI of the terminal and the S-TMSI of the terminal, so that when sending the downlink application layer data packet to the terminal, the base station can accurately send the downlink application layer data packet to the terminal.

Further, in the data transmission method provided in this embodiment of the present disclosure, after the base station receives the uplink application layer data packet sent on the first resource by the terminal, the base station may directly send the uplink application layer data packet to a gateway by using a common tunnel that is agreed upon or newly-established in advance; or the base station may directly send the uplink application layer data packet to a packet data network (PDN). This is not specifically limited in the present disclosure.

Optionally, the first resource may be broadcast by the base station by using a system broadcast message, or may be sent to the terminal by the base station by using a dedicated message. This is not specifically limited in the present disclosure.

Optionally, the first resource may be defined in a protocol.

Optionally, there may be multiple pieces of first resource. In this way, it can be ensured that a majority of multiple terminals in an idle state can successfully send an uplink application layer data packet to the base station.

Further, when there are multiple pieces of first resource, the terminal first needs to select one piece of first resource from the multiple pieces of first resource before step S502. Correspondingly, in step S502, the terminal sends, on the selected one piece of first resource, the uplink application layer data packet to the base station.

It should be noted that, for detailed other descriptions of the first resource, a quantity of pieces of first resource, and a manner in which the base station sends the first resource, refer to the related descriptions of the first resource, the quantity of pieces of first resource, and the manner in which the base station sends the first resource in the embodiment shown in FIG. 2. Details are not described herein.

Optionally, in step S502, before the terminal sends, on the first resource, the uplink application layer data packet to the base station, the terminal needs to first determine whether the terminal needs to send, on the first resource, the uplink application layer data packet to the base station. That is, a trigger condition for step S502 may be one of the following:

(1) when a amount of a to-be-sent data of the terminal in the idle state is less than or equal to a first threshold, the terminal sends, on the first resource, the uplink application layer data packet to the base station; or (2) when a sending interval between to-be-sent uplink application layer data packets of the terminal in the idle state is greater than or equal to a second threshold, the terminal sends, on the first resource, the uplink application layer data packet to the base station.

Values of the first threshold and the second threshold may be set according to an actual data transmission requirement, and are not specifically limited in the present disclosure.

Specifically, the trigger condition for determining, by the terminal in the idle state, whether the terminal needs to send, on the first resource, the uplink application layer data packet to the base station may be designed according to an actual requirement, and is not limited in the present disclosure.

Optionally, the terminal may indicate the to-be-sent data amount of the terminal (for example, the to-be-sent data amount may be indicated by using a buffer status report (BSR)) or the sending interval between the to-be-sent uplink application layer data packets of the terminal in step S502, so that the base station determines, according to the to-be-sent data amount of the terminal or the sending interval between the to-be-sent uplink application layer data packets of the terminal, whether the base station needs to receive the uplink application layer data packet sent from the terminal.

Optionally, the terminal may obtain, from a system broadcast message broadcast by the base station, configuration information of an uplink channel for sending an uplink application layer data packet; or the terminal may obtain, from a system broadcast message broadcast by the base station, configuration information of a downlink channel for receiving a downlink application layer data packet.

Figure 7:
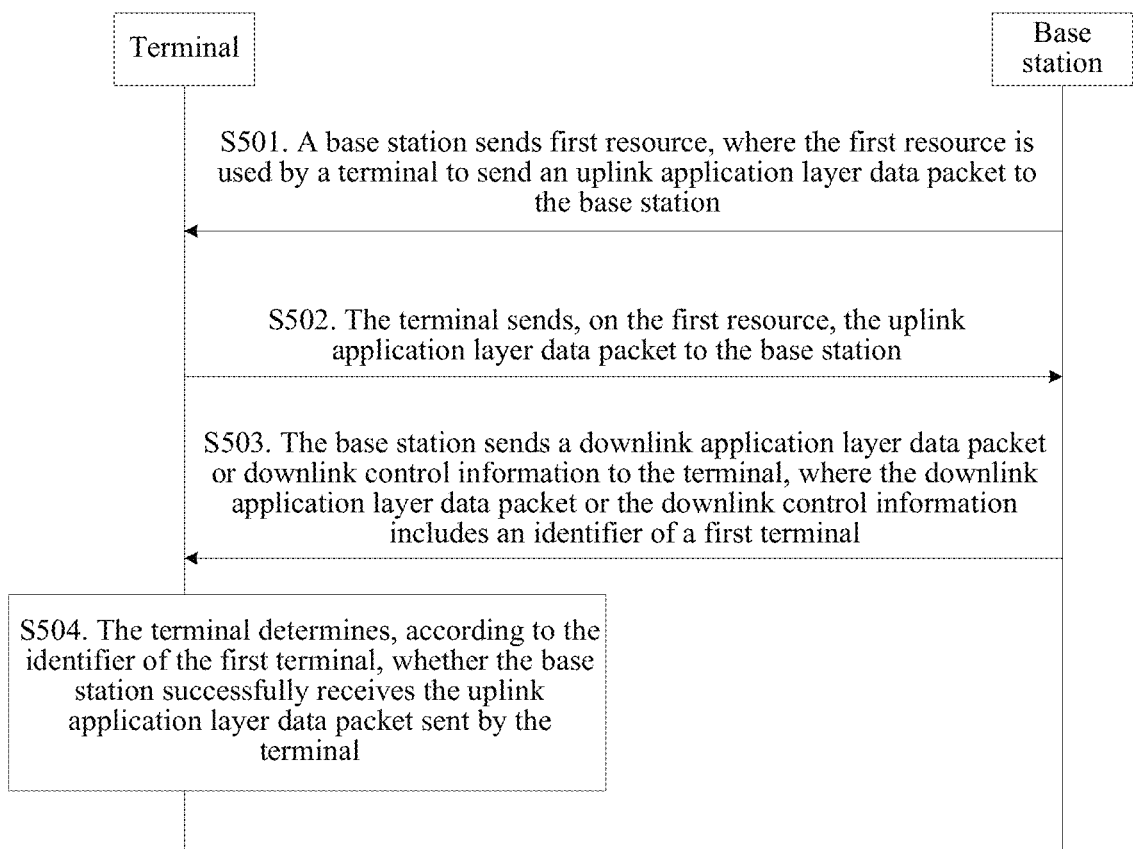
FIG. 7 is an interworking diagram 2 of a data transmission method according to an embodiment of the present disclosure.

Optionally, with reference to FIG. 6, as shown in FIG. 7, after step S502, that is, after the terminal sends, on the first resource, the uplink application layer data packet to the base station, the data transmission method provided in this embodiment of the present disclosure may further include the following steps.

S503. The base station sends a downlink application layer data packet or downlink control information to the terminal, where the downlink application layer data packet or the downlink control information includes an identifier of a first terminal, and the identifier of the first terminal is used to indicate that the base station successfully receives a first uplink application layer data packet sent from the first terminal.

S504. The terminal determines, according to the identifier of the first terminal, whether the base station successfully receives the uplink application layer data packet sent from the terminal.

Because two or more terminals in an idle state may simultaneously send, on the first resource, an uplink application layer data packet to the base station, the base station may successfully receive an uplink application layer data packet of only one terminal. To make the terminal learn whether the uplink application layer data packet sent from the terminal is successfully sent, after the base station receives an uplink application layer data packet, the base station may send a downlink application layer data packet or downlink control information on a shared channel. The downlink application layer data packet or the downlink control information includes the identifier of the first terminal. The first terminal is a terminal whose uplink application layer data packet is successfully received by the base station. The identifier of the first terminal may be used to indicate the terminal whose uplink application layer data packet is successfully received by the base station. The downlink application layer data packet sent from the base station to the terminal may be the uplink application layer data packet sent from the terminal to the base station or a part of the uplink application layer data packet. After terminals that transmit data to the base station by using the shared channel receives the downlink application layer data packet or the downlink control information sent from the base station, the terminals may determine, according to the identifier of the first terminal included in the downlink application layer data packet or the downlink control information, whether the base station successfully receives the uplink application layer data packet sent from the terminals. In this way, a terminal that determines that the base station does not successfully receive an uplink application layer data packet sent from the terminal may resend the uplink application layer data packet, or establish an RRC connection in an existing transmission manner and then send the uplink application layer data packet.

For example, if the identifier of the first terminal included in the downlink application layer data packet or the downlink control information is the identifier of the terminal in this embodiment of the present disclosure, after the terminal receives the downlink application layer data packet or the downlink control information, the terminal may determine that the base station successfully receives the uplink application layer data packet sent from the terminal.

Specifically, the base station may send the downlink control information to the terminal by using a PDCCH, so that the terminal may also receive, by listening on the PDCCH, the downlink control information sent from the base station.

This embodiment of the present disclosure provides a data transmission method. The method is: receiving, by a terminal in an idle state, first resource sent from a base station, where the first resource is used by the terminal to send an uplink application layer data packet to the base station; and sending, by the terminal, on the first resource, the uplink application layer data packet to the base station. Based on the foregoing technical solution, when the terminal in the idle state needs to initiate data transmission, the terminal may send, on the first resource that is used to send the uplink application layer data packet and is sent from the base station, the uplink application layer data packet to the base station, thereby initiating data transmission. In this embodiment of the present disclosure, after the terminal initiates data transmission, unlike the prior art in which an RRC connection is frequently established and released during data transmission between the terminal and the base station, a data packet can be directly transmitted between the terminal and the base station, so that data packet transmission efficiency can be improved.

Another possible implementation: a terminal needs to access a base station.

In this possible implementation, when accessing the base station, the terminal may request, from the base station, the first resource for sending an uplink application layer data packet. Specifically, the terminal may request, from the base station by using access resource for sending an access sequence, the first resource for sending the uplink application layer data packet; or the base station may request, from the base station by using the access sequence sent from the terminal, the first resource for sending the uplink application layer data packet. The case is separately described below in detail.

Figure 8:
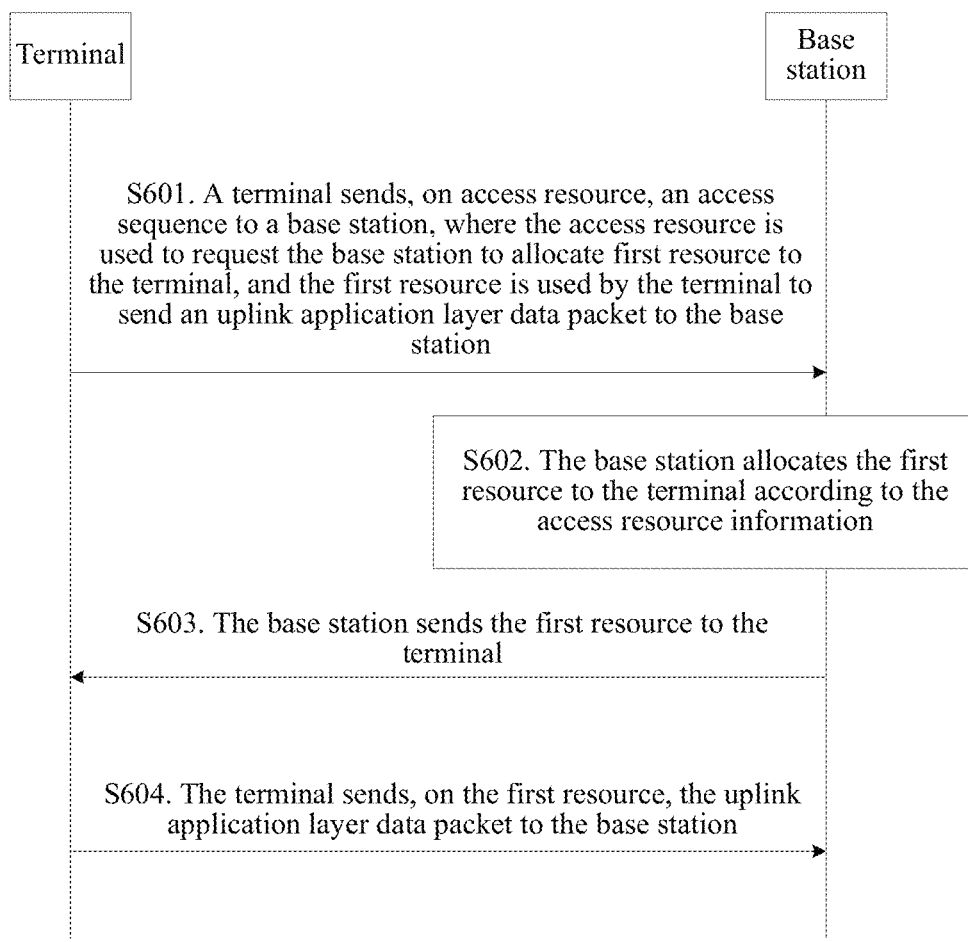
FIG. 8 is an interworking diagram 3 of a data transmission method according to an embodiment of the present disclosure.

Case 1: The terminal requests, from the base station by using the access resource for sending the access sequence, the first resource for sending the uplink application layer data packet As shown in FIG. 8, an embodiment of the present disclosure provides a data transmission method, and the data transmission method may include the following steps.

S601. A terminal sends, on access resource, an access sequence to a base station, where the access resource is used to request the base station to allocate first resource to the terminal, and the first resource is used by the terminal to send an uplink application layer data packet to the base station.

S602. The base station allocates the first resource to the terminal according to the access resource.

S603. The base station sends the first resource to the terminal.

S604. The terminal sends, on the first resource, the uplink application layer data packet to the base station.

The access resource and the access sequence in step S601 may be broadcast by the base station by using a system broadcast message. In this embodiment, the access resource may be used by a terminal in an idle state to request the base station to allocate, to the terminal, resource information for sending an uplink application layer data packet, that is, the first resource. After the base station receives the access sequence sent on the access resource by the terminal in the idle state, the base station may allocate the first resource to the terminal, so that the terminal in the idle state can directly send, on the first resource, the uplink application layer data packet to the base station.

In the data transmission method provided in this embodiment of the present disclosure, the terminal in the idle state may request, by using the access resource (the access resource in this embodiment may be resource information used by the terminal to initiate random access), the base station to allocate, to the terminal, the first resource for sending the uplink application layer data packet.

The access resource in this embodiment may be used by the terminal in the idle state to request, from the base station, the first resource for sending the uplink application layer data packet. Therefore, the access resource in this embodiment may be implemented by adding a field into normal access resource. The field indicates that the access resource may be used by the terminal to request, from the base station, the first resource for sending the uplink application layer data packet. Alternatively, the access resource in this embodiment may be implemented by separately designing new access resource. The new access resource may be used by the terminal to request, from the base station, the first resource for sending the uplink application layer data packet, and a structure of the new access resource may be the same as a structure of the normal access resource.

In particular, the normal access resource may be access resource used by the terminal to perform random access, that is, by the terminal to send the access sequence in a general case.

It should be noted that, in this embodiment, the access sequence sent on the access resource by the terminal to the base station may be a normal access sequence. For example, the access sequence may be an access sequence used by the terminal to perform random access in a general case.

Optionally, the access resource may be time-frequency resource information, for example, time domain resource information and frequency domain resource information; or the access resource may be time resource information, for example, a frame number and a subframe number. Specifically, the access resource may be designed according to an actual use requirement, and is not limited in the present disclosure.

Optionally, the access resource may be broadcast by the base station by using a system broadcast message, or may be sent to the terminal by the base station by using a dedicated message, or may be defined in a protocol. This is not specifically limited in the present disclosure.

Optionally, there may be multiple pieces of access resource. In this way, it can be ensured that a majority of multiple terminals in an idle state can successfully access the base station and request, from the base station, the first resource for sending the uplink application layer data packet.

Further, when there are multiple pieces of access resource, the terminal first needs to select one piece of access resource from the multiple pieces of access resource before step S601. Correspondingly, in step S601, the terminal sends the access sequence to the base station on the selected one piece of access resource.

The terminal may select one piece of access resource from the multiple pieces of access resource in a random selection manner; or the terminal may select one piece of access resource from the multiple pieces of access resource according to an identifier of the terminal; or the terminal may select on piece of access resource from the multiple pieces of access resource according to a group allocated by the base station to the terminal; or the terminal may select one piece of access resource from the multiple pieces of access resource in another manner. A specific selection manner is not limited in the present disclosure.

It should be noted that, a method for selecting, by the terminal, one piece of access resource from the multiple pieces of access resource according to the identifier of the terminal is similar to the method for selecting, by the terminal, one piece of first resource from the multiple pieces of first resource according to the identifier of the terminal; a method for selecting, by the terminal, one piece of access resource from the multiple pieces of access resource according to the group allocated by the base station to the terminal is similar to a method for selecting, by the terminal, one piece of first resource from the multiple pieces of first resource according to the group allocated by the base station to the terminal. For details, refer to the related descriptions in the embodiment shown in FIG. 2, and details are not described herein.

Optionally, before the terminal sends, on the access resource, the access sequence to the base station in step S601, the terminal needs to first determine whether the terminal needs to request, from the base station, the first resource for sending the uplink application layer data packet. That is, a trigger condition for step S601 is one of the following:

(1) when a amount of a to-be-sent data of the terminal in the idle state is less than or equal to a first threshold, the terminal sends, on the access resource, the access sequence to the base station; or (2) when a sending interval between to-be-sent uplink application layer data packets of the terminal in the idle state is greater than or equal to a second threshold, the terminal sends, on the access resource, the access sequence to the base station.

Values of the first threshold and the second threshold may be set according to an actual data transmission requirement, and are not specifically limited in the present disclosure.

Specifically, the trigger condition for determining, by the terminal in the idle state, whether the terminal needs to request, from the base station, the first resource for sending the uplink application layer data packet may be designed according to an actual requirement, and is not limited in the present disclosure.

Optionally, the base station may respond to the terminal by agreeing or refusing to allocate, to the terminal, the first resource for sending the uplink application layer data packet. If the base station agrees to allocate the first resource to the terminal, the base station may directly allocate the first resource to the terminal, that is, the terminal may directly send, on the first resource, the uplink application layer data packet to the base station. If the base station refuses to allocate the first resource to the terminal, the base station may instruct the terminal to initiate an RRC connection establishment process and transmit data in a data transmission manner in the prior art after an RRC connection is established. Details are not described herein.

Optionally, if the base station agrees to allocate the first resource to the terminal, the base station may further allocate an identifier to the terminal and instruct the terminal to store the identifier. The identifier may be a cell-level identifier of the terminal, for example, may be a C-RNTI of the terminal. The identifier may be used by the base station to send a downlink application layer data packet to the terminal.

When the terminal has stored a C-RNTI of the terminal, if the base station allocates a new C-RNTI to the terminal, the terminal may update the C-RNTI stored in the terminal.

For example, after a terminal camps on a cell for the first time or performs cell reselection, the terminal may instruct a base station that serves the terminal to allocate a new C-RNTI to the terminal. After the terminal receives the new C-RNTI allocated by the base station to the terminal, the terminal stores the new C-RNTI or uses the new C-RNTI to cover an old C-RNTI (the old C-RNTI may be understood as a C-RNTI stored before the terminal receives the new C-RNTI), and the terminal may instruct the base station that originally serves the terminal to release the old C-RNTI.

A method for instructing, by the terminal, the base station that originally serves the terminal to release the old C-RNTI may be: The terminal may periodically send an on-network indication message to the base station. The on-network indication message is used to indicate that the terminal is within a coverage area of the base station. If the base station does not receive, within a preset time, for example, 24 hours, the on-network indication message sent from the terminal, the base station may consider that the terminal is already out of the coverage area of the base station, so that the base station may release the C-RNTI allocated by the base station to the terminal.

In step S604, when the terminal sends, on the first resource, the uplink application layer data packet to the base station, the uplink application layer data packet may carry an IP address of the terminal, a C-RNTI of the terminal, or another identifier of the terminal. The another identifier of the terminal may be a unique identifier allocated by a core network device to the terminal, for example, an S-TMSI of the terminal. Alternatively, the terminal may add an IP address of the terminal, a C-RNTI of the terminal, or another identifier of the terminal into a MAC header of the uplink application layer data packet. Specifically, this is not limited in the present disclosure. The uplink application layer data packet may be an uplink IP data packet.

Further, when the uplink application layer data packet or the MAC header of the uplink application layer data packet carries the IP address of the terminal, or the uplink application layer data packet or the MAC header of the uplink application layer data packet carries the another identifier of the terminal, after the base station receives the uplink application layer data packet sent from the terminal, the base station may establish a correspondence between the identifier allocated by the base station to the terminal and the identifier of the terminal carried in the uplink application layer data packet, so that when sending the downlink application layer data packet to the terminal, the base station can accurately send the downlink application layer data packet to the terminal. Specifically, for descriptions of establishing, by the base station, the correspondence between the identifier allocated by the base station to the terminal and the identifier of the terminal carried in the uplink application layer data packet, refer to the related descriptions in the embodiment shown in FIG. 6, and details are not described herein.

Further, in the data transmission method provided in this embodiment of the present disclosure, after the base station receives the uplink application layer data packet sent on the first resource by the terminal, the base station may directly send the uplink application layer data packet to a gateway by using a common tunnel that is agreed upon or newly-established in advance; or the base station may directly send the uplink application layer data packet to a PDN. This is not specifically limited in the present disclosure.

It should be noted that, for detailed descriptions of the first resource, a quantity of pieces of first resource, and a manner in which the base station sends the first resource, refer to the related descriptions of the first resource, the quantity of pieces of first resource, and the manner in which the base station sends the first resource in the embodiment shown in FIG. 6. Details are not described herein.

Optionally, the first resource in this embodiment may be time-frequency resource information, for example, time domain resource information and frequency domain resource information; or the first resource may be time resource information, for example, a frame number and a subframe number. Specifically, the first resource may be designed according to an actual use requirement, and is not limited in the present disclosure.

Optionally, the terminal may indicate the to-be-sent data amount of the terminal (for example, the to-be-sent data amount may be indicated by using a BSR) or the sending interval between the to-be-sent uplink application layer data packets of the terminal in step S601 or S604, so that the base station determines, according to the to-be-sent data amount of the terminal or the sending interval between the to-be-sent uplink application layer data packets of the terminal, whether the base station needs to allocate, to the terminal, the first resource for sending the uplink application layer data packet.

Optionally, when the terminal indicates, in step S601, the to-be-sent data amount of the terminal or the sending interval between the to-be-sent uplink application layer data packets of the terminal, in step S603, the base station may indicate, according to the to-be-sent data amount of the terminal, a segment of time resource (that is, the first resource is a segment of time resource) that is available to the terminal, for example, multiple transmission time intervals (TTI); or the base station may indicate, according to the to-be-sent data amount of the terminal, a duration of the first resource that can be used by the terminal. In this way, the terminal may not need to request, within a time period from the base station, the resource information for sending the uplink application layer data packet, so that data sending efficiency can be improved.

Optionally, the terminal may obtain, from a system broadcast message broadcast by the base station, configuration information of an uplink channel for sending an uplink application layer data packet; or the terminal may obtain, from a system broadcast message broadcast by the base station, configuration information of a downlink channel for receiving a downlink application layer data packet.

Figure 9:
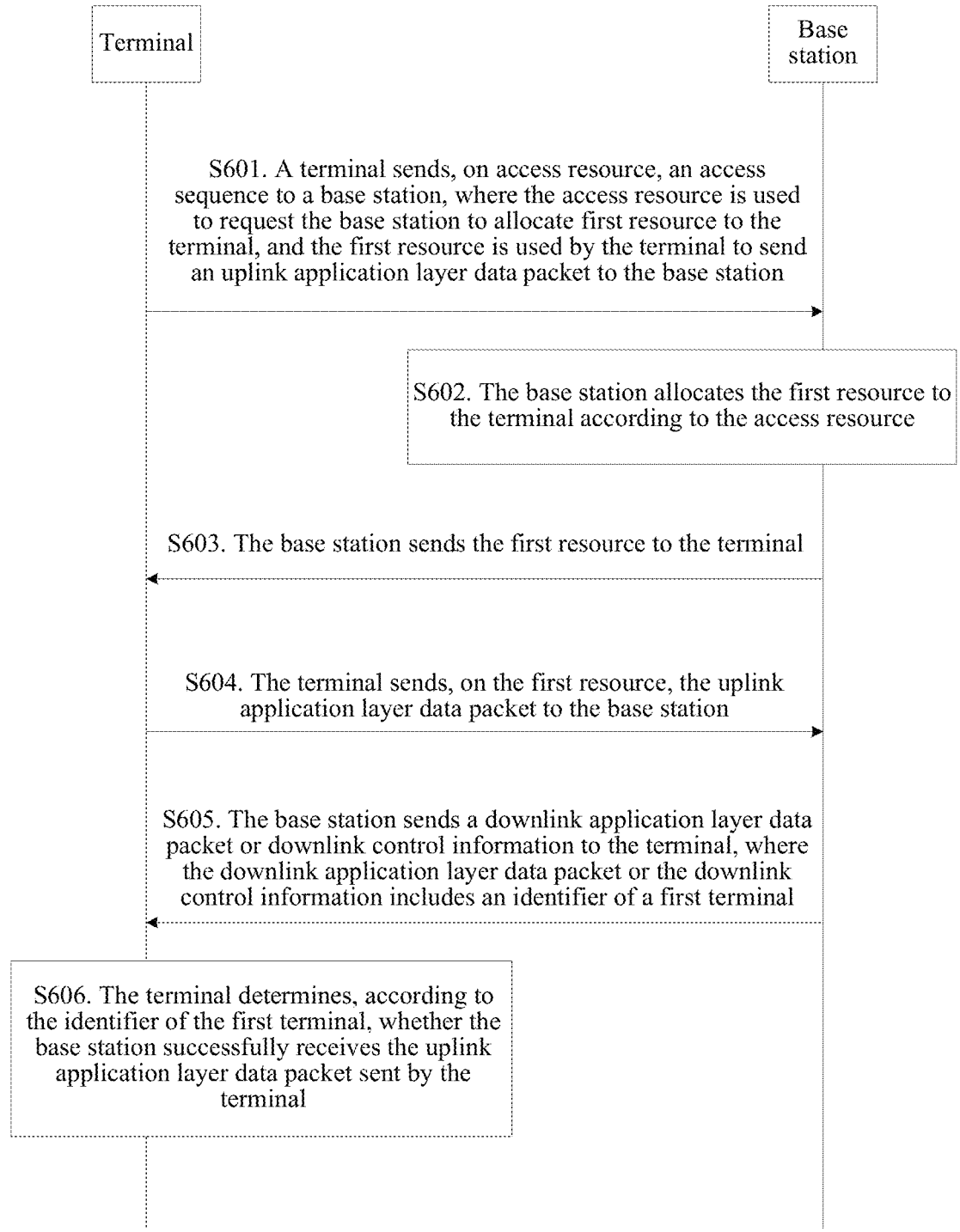
FIG. 9 is an interworking diagram 4 of a data transmission method according to an embodiment of the present disclosure.

Optionally, with reference to FIG. 8, as shown in FIG. 9, after step S604, that is, after the terminal sends, on the first resource, the uplink application layer data packet to the base station, the data transmission method provided in this embodiment of the present disclosure may further include the following steps.

S605. The base station sends a downlink application layer data packet or downlink control information to the terminal, where the downlink application layer data packet or the downlink control information includes an identifier of a first terminal, and the identifier of the first terminal is used to indicate that the base station successfully receives a first uplink application layer data packet sent from the first terminal.

S606. The terminal determines, according to the identifier of the first terminal, whether the base station successfully receives the uplink application layer data packet sent from the terminal.

For detailed descriptions of steps S605 and S606, refer to the related descriptions of steps S503 and S504 in the embodiment shown in FIG. 7, and details are not described herein.

For example, if the identifier of the first terminal included in the downlink application layer data packet or the downlink control information is the identifier of the terminal in this embodiment of the present disclosure, after the terminal receives the downlink application layer data packet or the downlink control information, the terminal may determine that the base station successfully receives the uplink application layer data packet sent from the terminal.

Specifically, the base station may send the downlink control information to the terminal by using a PDCCH, so that the terminal may also receive, by listening on the PDCCH, the downlink control information sent from the base station.

This embodiment of the present disclosure provides a data transmission method. The method is: sending, by a terminal in an idle state, on access resource, an access sequence to a base station; allocating, by the base station to the terminal according to the access resource, first resource for sending an uplink application layer data packet, and sending the first resource to the terminal; and sending, by the terminal, on the first resource, the uplink application layer data packet to the base station. Based on the foregoing technical solution, when the terminal in the idle state needs to initiate data transmission, the terminal may request, from the base station by using the access resource for sending the access sequence, the first resource for sending the uplink application layer data packet; and after the base station allocates the first resource to the terminal, the terminal sends, on the first resource, the uplink application layer data packet to the base station, thereby initiating data transmission. In this embodiment of the present disclosure, after the terminal initiates data transmission, unlike the prior art in which an RRC connection is frequently established and released during data transmission between the terminal and the base station, a data packet can be directly transmitted between the terminal and the base station, so that data packet transmission efficiency can be improved.

Case 2: The terminal requests, from the base station by using the sent access sequence, the first resource for sending the uplink application layer data packet.

Figure 10:
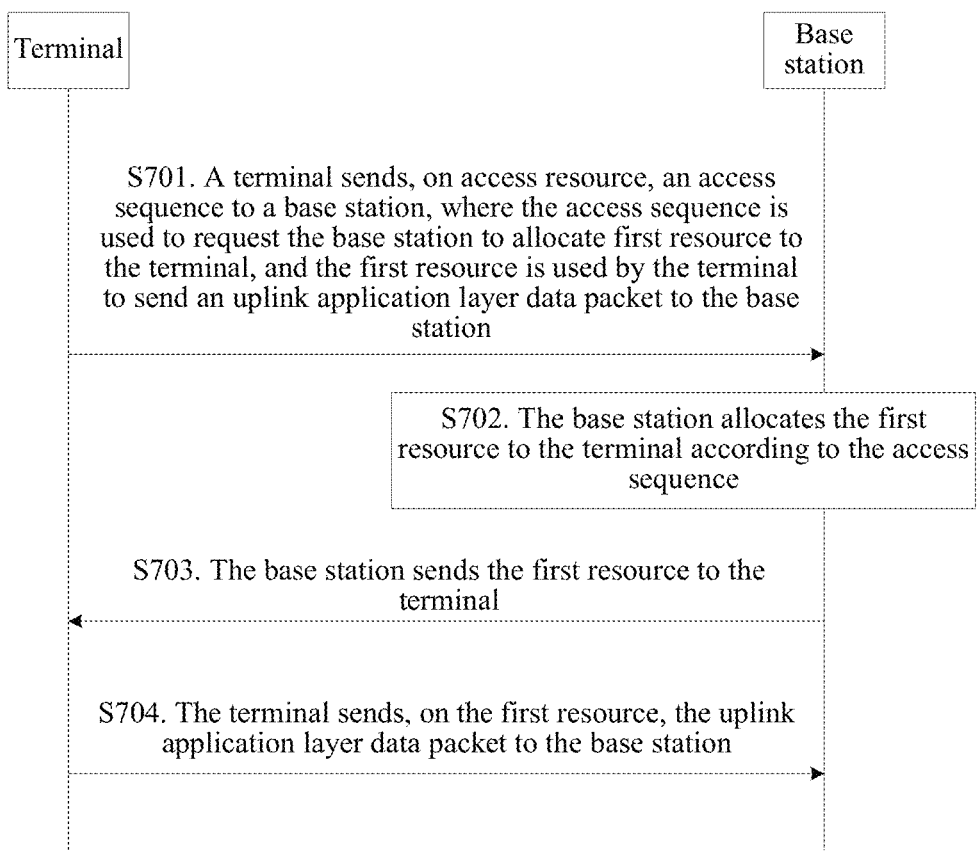
FIG. 10 is an interworking diagram 5 of a data transmission method according to an embodiment of the present disclosure.

As shown in FIG. 10, an embodiment of the present disclosure provides a data transmission method, and the data transmission method may include the following steps.

S701. A terminal sends, on access resource, an access sequence to a base station, where the access sequence is used to request the base station to allocate first resource to the terminal, and the first resource is used by the terminal to send an uplink application layer data packet to the base station.

S702. The base station allocates the first resource to the terminal according to the access sequence.

S703. The base station sends the first resource to the terminal.

S704. The terminal sends, on the first resource, the uplink application layer data packet to the base station.

The access resource and the access sequence in step S701 may be broadcast by the base station by using a system broadcast message. In this embodiment, the access sequence may be used by a terminal in an idle state to request the base station to allocate, to the terminal, resource information for sending an uplink application layer data packet, that is, the first resource. After the base station receives the access sequence sent on the access resource by the terminal in the idle state, the base station may allocate the first resource to the terminal, so that the terminal in the idle state can directly send, on the first resource, the uplink application layer data packet to the base station.

In the data transmission method provided in this embodiment of the present disclosure, the terminal in the idle state may request, by using the access sequence (the access sequence in this embodiment may be an access sequence used by the terminal to initiate random access), the base station to allocate, to the terminal, the first resource for sending the uplink application layer data packet.

The access sequence in this embodiment may be used by the terminal in the idle state to request, from the base station, the first resource for sending the uplink application layer data packet. Therefore, the access sequence in this embodiment may be implemented by adding a field into a normal access sequence. The field indicates that the access sequence may be used by the terminal to request, from the base station, the first resource for sending the uplink application layer data packet. Alternatively, the access sequence in this embodiment may be implemented by separately designing a new access sequence. The new access sequence may be used by the terminal to request, from the base station, the first resource for sending the uplink application layer data packet, and a structure of the new access sequence may be the same as a structure of the normal access sequence.

In particular, the normal access sequence may be an access sequence used by the terminal to perform random access in a usual case.

Optionally, the access resource may be time-frequency resource information, for example, time domain resource information and frequency domain resource information; or the access resource may be time resource information, for example, a frame number and a subframe number. Specifically, the access resource may be designed according to an actual use requirement, and is not limited in the present disclosure.

Optionally, the access resource may be broadcast by the base station by using a system broadcast message, or may be sent to the terminal by the base station by using a dedicated message, or may be defined in a protocol. This is not specifically limited in the present disclosure. Specifically, for detailed descriptions of the access resource, refer to the related descriptions of the access resource in the embodiment shown in FIG. 8, and details are not described herein.

Optionally, the access sequence may be broadcast by the base station by using a system broadcast message, or may be sent to the terminal by the base station by using a dedicated message, or may be defined in a protocol. This is not specifically limited in the present disclosure.

Optionally, there may be multiple access sequences. In this way, it can be ensured that a majority of multiple terminals in an idle state can successfully access the base station and request, from the base station, the first resource for sending the uplink application layer data packet.

Further, when there are multiple access sequences, the terminal needs to first select one access sequence from the multiple access sequences before step S701. Correspondingly, the terminal sends, on the access resource, the access sequence to the base station in step S701.

The terminal may select one access sequence from the multiple access sequences in a random selection manner; or the terminal may select one access sequence from the multiple access sequences according to an identifier of the terminal; or the terminal may select one access sequence from the multiple access sequences according to a group allocated by the base station to the terminal; or the terminal may select one access sequence from the multiple access sequences in another manner. A specific selection manner is not limited in the present disclosure.

It should be noted that, a method for selecting, by the terminal, one access sequence from the multiple access sequences according to the identifier of the terminal is similar to the method for selecting, by the terminal, one piece of first resource from the multiple pieces of first resource according to the identifier of the terminal; a method for selecting, by the terminal, one access sequence from the multiple access sequences according to the group allocated by the base station to the terminal is similar to a method for selecting, by the terminal, one piece of first resource from the multiple pieces of first resource according to the group allocated by the base station to the terminal. Refer to the detailed related descriptions in the embodiment shown in FIG. 2, and details are not described herein.

Optionally, before the terminal sends, on the access resource, the access sequence to the base station in step S701, the terminal needs to first determine whether the terminal needs to request, from the base station, the first resource for sending the uplink application layer data packet. That is, a trigger condition for step S701 is one of the following:

(1) when a amount of a to-be-sent data of the terminal in the idle state is less than or equal to a first threshold, the terminal sends, on the access resource, the access sequence to the base station; or (2) when a sending interval between to-be-sent uplink application layer data packets of the terminal in the idle state is greater than or equal to a second threshold, the terminal sends, on the access resource, the access sequence to the base station.

Values of the first threshold and the second threshold may be set according to an actual data transmission requirement, and are not specifically limited in the present disclosure.

Specifically, the trigger condition for determining, by the terminal in the idle state, whether the terminal needs to request, from the base station, the first resource for sending the uplink application layer data packet may be designed according to an actual requirement, and is not limited in the present disclosure.

Optionally, the base station may respond to the terminal by agreeing or refusing to allocate, to the terminal, the first resource for sending the uplink application layer data packet. If the base station agrees to allocate the first resource to the terminal, the base station may directly allocate the first resource to the terminal, that is, the terminal may directly send, on the first resource, the uplink application layer data packet to the base station. If the base station refuses to allocate the first resource to the terminal, the base station may instruct the terminal to initiate an RRC connection establishment process and transmit data in a data transmission manner in the prior art after an RRC connection is established. Details are not described herein.

Optionally, if the base station agrees to allocate the first resource to the terminal, the base station may further allocate an identifier to the terminal and instruct the terminal to store the identifier. The identifier may be a cell-level identifier of the terminal, for example, may be a C-RNTI of the terminal. The identifier may be used by the base station to send a downlink application layer data packet to the terminal.

Specifically, for descriptions of the C-RNTI of the terminal, refer to the related descriptions of the C-RNTI of the terminal in the embodiment shown in FIG. 8, and details are not described herein.

In step S704, when the terminal sends, on the first resource, the uplink application layer data packet to the base station, the uplink application layer data packet may carry an IP address of the terminal, a C-RNTI of the terminal, or another identifier of the terminal. The another identifier of the terminal may be a unique identifier allocated by a core network device to the terminal, for example, an S-TMSI of the terminal. Alternatively, the terminal may add an IP address of the terminal, a C-RNTI of the terminal, or another identifier of the terminal into a MAC header of the uplink application layer data packet. Specifically, this is not limited in the present disclosure. The uplink application layer data packet may be an uplink IP data packet.

Further, when the uplink application layer data packet or the MAC header of the uplink application layer data packet carries the IP address of the terminal, or the uplink application layer data packet or the MAC header of the uplink application layer data packet carries the another identifier of the terminal, after the base station receives the uplink application layer data packet sent from the terminal, the base station may establish a correspondence between the identifier allocated by the base station to the terminal and the identifier of the terminal carried in the uplink application layer data packet, so that when sending the downlink application layer data packet to the terminal, the base station can accurately send the downlink application layer data packet to the terminal. Specifically, for descriptions of establishing, by the base station, the correspondence between the identifier allocated by the base station to the terminal and the identifier of the terminal carried in the uplink application layer data packet, refer to the related descriptions in the embodiment shown in FIG. 6, and details are not described herein.

Further, in the data transmission method provided in this embodiment of the present disclosure, after the base station receives the uplink application layer data packet sent on the first resource by the terminal, the base station may directly send the uplink application layer data packet to a gateway by using a common tunnel that is agreed upon or newly-established in advance; or the base station may directly send the uplink application layer data packet to a PDN. This is not specifically limited in the present disclosure.

It should be noted that, specifically, for detailed descriptions of the first resource, a quantity of pieces of first resource, and a manner in which the base station sends the first resource, refer to the related descriptions of the first resource, the quantity of pieces of first resource, and the manner in which the base station sends the first resource in the embodiment shown in FIG. 6. Details are not described herein.

Optionally, the first resource in this embodiment may be time-frequency resource information, for example, time domain resource information and frequency domain resource information; or the first resource may be time resource information, for example, a frame number and a subframe number. Specifically, the first resource may be designed according to an actual use requirement, and is not limited in the present disclosure.

Optionally, the terminal may indicate the to-be-sent data amount of the terminal (for example, the to-be-sent data amount may be indicated by using a BSR) or the sending interval between the to-be-sent uplink application layer data packets of the terminal in step S701 or S704, so that the base station determines, according to the to-be-sent data amount of the terminal or the sending interval between the to-be-sent uplink application layer data packets of the terminal, whether the base station needs to allocate, to the terminal, the first resource for sending the uplink application layer data packet.

Optionally, when the terminal indicates, in step S701, the to-be-sent data amount of the terminal or the sending interval between the to-be-sent uplink application layer data packets of the terminal, in step S703, the base station may indicate, according to the to-be-sent data amount of the terminal, a segment of time resource (that is, the first resource is a segment of time resource) that is available to the terminal, for example, multiple TTIs; or the base station may indicate, according to the to-be-sent data amount of the terminal, a duration of the first resource that can be used by the terminal. In this way, the terminal may not need to request, within a time period from the base station, the resource information for sending the uplink application layer data packet, so that data sending efficiency can be improved.

Optionally, the terminal may obtain, from a system broadcast message broadcast by the base station, configuration information of an uplink channel for sending an uplink application layer data packet; or the terminal may obtain, from a system broadcast message broadcast by the base station, configuration information of a downlink channel for receiving a downlink application layer data packet.

Figure 11:
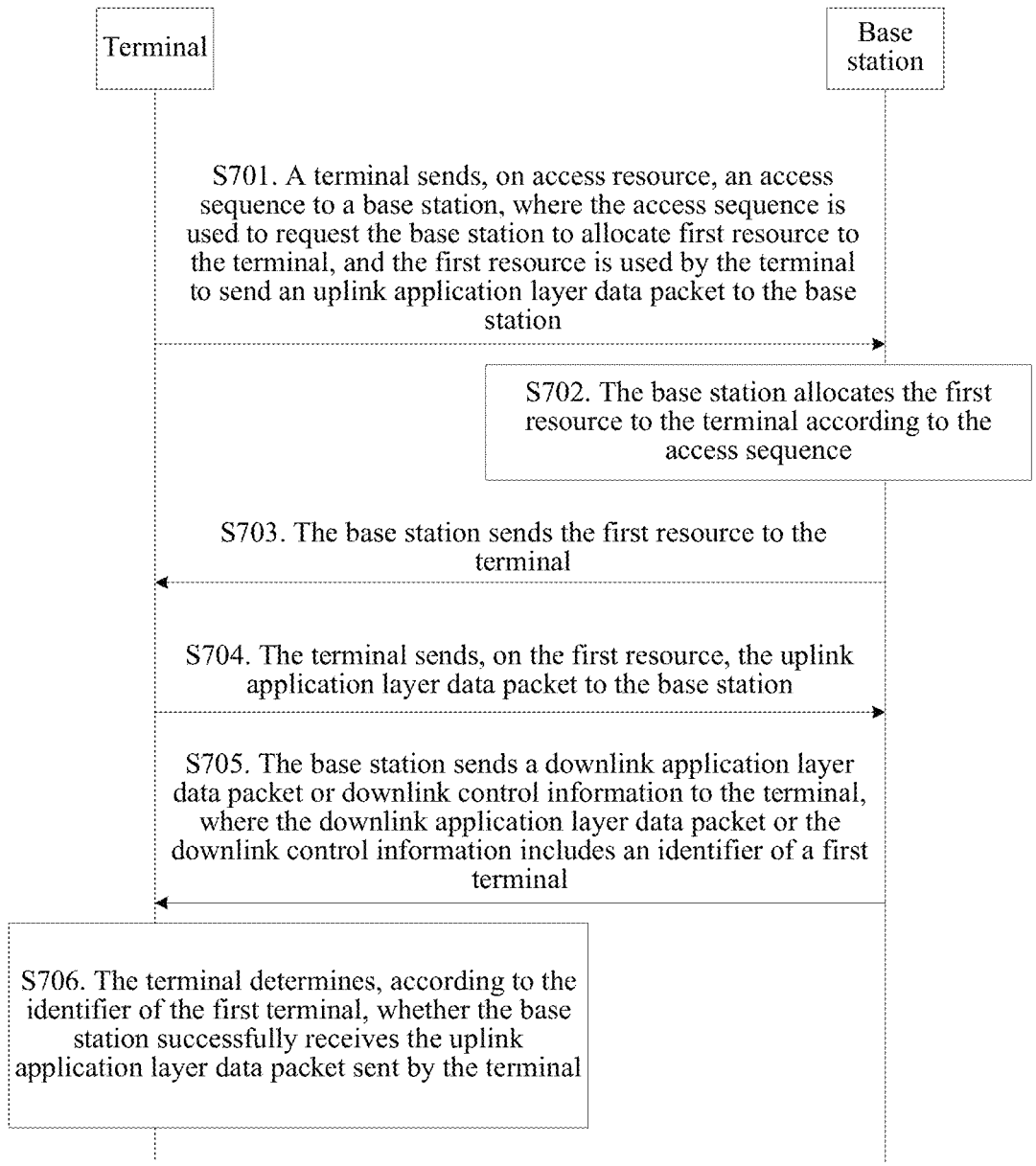
FIG. 11 is an interworking diagram 6 of a data transmission method according to an embodiment of the present disclosure.

Optionally, with reference to FIG. 10, as shown in FIG. 11, after step S704, that is, after the terminal sends, on the first resource, the uplink application layer data packet to the base station, the data transmission method provided in this embodiment of the present disclosure may further include the following steps.

S705. The base station sends a downlink application layer data packet or downlink control information to the terminal, where the downlink application layer data packet or the downlink control information includes an identifier of a first terminal, and the identifier of the first terminal is used to indicate that the base station successfully receives a first uplink application layer data packet sent from the first terminal.

S706. The terminal determines, according to the identifier of the first terminal, whether the base station successfully receives the uplink application layer data packet sent from the terminal.

For detailed descriptions of steps S705 and S706, refer to the related descriptions of steps S503 and S504 in the embodiment shown in FIG. 7, and details are not described herein.

For example, if the identifier of the first terminal included in the downlink application layer data packet or the downlink control information is the identifier of the terminal in this embodiment of the present disclosure, after the terminal receives the downlink application layer data packet or the downlink control information, the terminal may determine that the base station successfully receives the uplink application layer data packet sent from the terminal.

Specifically, the base station may send the downlink control information to the terminal by using a PDCCH, so that the terminal may also receive, by listening on the PDCCH, the downlink control information sent from the base station.

This embodiment of the present disclosure provides a data transmission method. The method includes: sending, by a terminal in an idle state, on access resource, an access sequence to a base station; allocating, by the base station to the terminal according to the access sequence, first resource for sending an uplink application layer data packet, and sending the first resource to the terminal; and sending, by the terminal, on the first resource, the uplink application layer data packet to the base station. Based on the foregoing technical solution, when the terminal in the idle state needs to initiate data transmission, the terminal may request, from the base station by using the access sequence, the first resource for sending the uplink application layer data packet; and after the base station allocates the first resource to the terminal, the terminal sends, on the first resource, the uplink application layer data packet to the base station, thereby initiating data transmission. In this embodiment of the present disclosure, after the terminal initiates data transmission, unlike the prior art in which an RRC connection is frequently established and released during data transmission between the terminal and the base station, a data packet can be directly transmitted between the terminal and the base station, so that data packet transmission efficiency can be improved.

Optionally, the downlink control channel in the embodiments shown in FIG. 7, FIG. 9, and FIG. 11 may be a channel different from a PDCCH in the prior art. For example, the downlink control information (referred to as first downlink control information for short) is sent from using another segment of resource. The other segment of resource is the downlink control channel, and the first downlink control information occupies fewer bits than the downlink control information in the prior art (that is, content of the first downlink control information is less than content of the downlink control information in the prior art). For example, the first downlink control information includes only an identifier of the terminal and/or radio resource information of a downlink data channel.

Optionally, in the embodiments shown in FIG. 6, FIG. 7, FIG. 8, FIG. 9, FIG. 10, and FIG. 11, the uplink application layer data packet may be replaced with an uplink signaling data packet, an uplink MAC layer control packet, or an uplink physical layer sequence; the downlink application layer data packet or the downlink control information may be replaced with a downlink signaling data packet or a downlink MAC layer control packet; the first uplink application layer data packet may be replaced with a first uplink signaling data packet, a first uplink MAC layer control packet, or a first uplink physical layer sequence; and the to-be-sent uplink application layer data packet may be replaced with a to-be-sent uplink signaling data packet, a to-be-sent uplink MAC layer control packet, or a to-be-sent uplink physical layer sequence.

For detailed descriptions and examples of the uplink application layer data packet, the uplink signaling data packet, the uplink MAC layer control packet, the uplink physical layer sequence, the downlink application layer data packet, the downlink signaling data packet, the downlink MAC layer control packet, and the downlink control information, refer to the related descriptions in the SUMMARY part (for details, refer to the related descriptions in some optional manners before the seventh aspect of the SUMMARY part), and details are not described herein.

Optionally, in this embodiment of the present disclosure, the terminal may indicate, by using information such as a logical channel and/or a destination address of a data packet that needs to be sent, a destination network node of the data packet that is to be forwarded by the base station. The destination network node may be a base station control node or a core network node.

Optionally, in this embodiment of the present disclosure, any one of the base station, the base station control node, or the core network node can allocate a NAS user temporary identifier to the terminal.

Optionally, in the foregoing embodiments, in addition to the C-RNTI, the identifier allocated by the base station to the terminal may be the unique X-RNTI, described before Embodiment 1, of the terminal shared in the area of the multiple cells. A length of the X-RNTI is greater than that of the C-RNTI, but less than that of the NAS user temporary identifier. For example, the length of the X-RNTI is between 16 bits and 40 bits. Preferably, the length of the X-RNTI is 24 bits.

According to the data transmission method in this embodiment of the present disclosure, because multiple types of data packets (for example, an application layer data packet, a signaling data packet, a MAC layer control packet, and a physical layer sequence) can be transmitted between a terminal in an idle state and a base station, the terminal can more easily and flexibly initiate data transmission. Therefore, a data packet can be directly transmitted between the terminal and the base station more easily and flexibly, and data packet transmission efficiency is improved.

Figure 12:
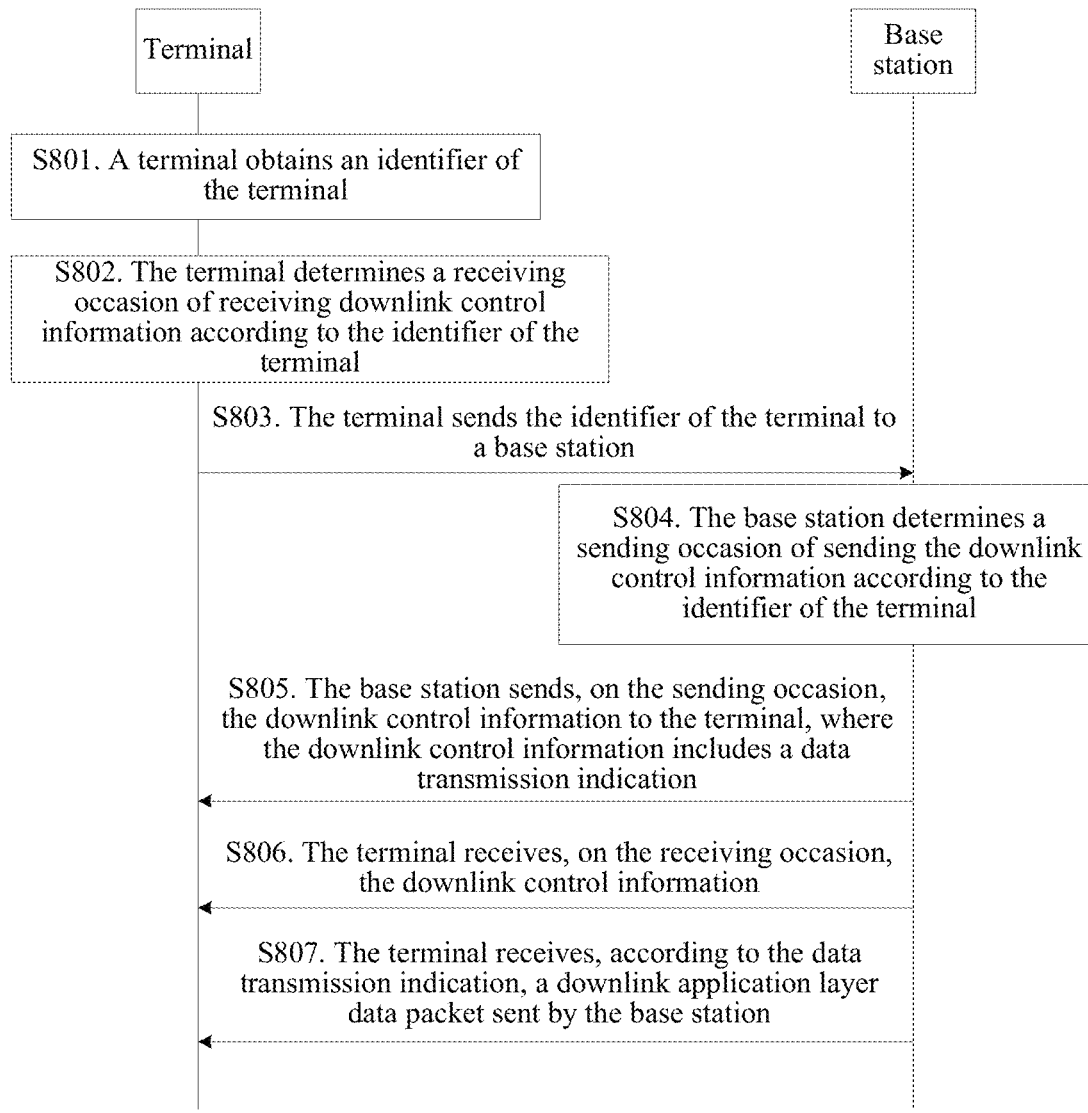
FIG. 12 is an interworking diagram 7 of a data transmission method according to an embodiment of the present disclosure.

As shown in FIG. 12, an embodiment of the present disclosure provides a data transmission method, and the data transmission method may include the following steps.

S801. A terminal obtains an identifier of the terminal, where the identifier of the terminal is used by the terminal to determine a receiving occasion of downlink control information, and the identifier of the terminal is at least one of a C-RNTI of the terminal or an IP address of the terminal.

S802. The terminal determines the receiving occasion of receiving the downlink control information according to the identifier of the terminal.

S803. The terminal sends the identifier of the terminal to a base station, where the identifier of the terminal is used by the base station to determine a sending occasion of sending the downlink control information.

S804. The base station determines the sending occasion of sending the downlink control information according to the identifier of the terminal.

S805. The base station sends, on the sending occasion, the downlink control information to the terminal, where the downlink control information includes a data transmission indication, and the data transmission indication is used to instruct the terminal to receive a downlink application layer data packet sent from the base station.

S806. The terminal receives, on the receiving occasion, the downlink control information.

S807. The terminal receives, according to the data transmission indication, the downlink application layer data packet sent from the base station.

That the terminal obtains the identifier of the terminal in step S801 may be specifically: the terminal may receive a C-RNTI allocated by the base station to the terminal; or the terminal may receive an IP address allocated by another network side device to the terminal.

That the terminal determines the receiving occasion of receiving the downlink control information according to the identifier of the terminal in step S802 may be specifically:

the terminal may determine the receiving occasion of receiving the downlink control information according to the C-RNTI of the terminal; or the terminal may determine the receiving occasion of receiving the downlink control information according to the IP address of the terminal or a part of the IP address.

Correspondingly, a process of determining, by the base station, the sending occasion of sending the downlink control information according to the identifier of the terminal is similar to a process of determining, by the terminal, the receiving occasion of receiving the downlink control information according to the identifier of the terminal. Details are not described herein.

It should be noted that the identifier used by the terminal to determine the receiving occasion of receiving the downlink control information is the same as the identifier used by the base station to determine the sending occasion of sending the downlink control information. For example, if the terminal determines the receiving occasion of receiving the downlink control information by using the C-RNTI of the terminal, the base station also determines the sending occasion of sending the downlink control information by using the C-RNTI of the terminal; or if the terminal determines the receiving occasion of receiving the downlink control information by using the IP address of the terminal, the base station also determines the sending occasion of sending the downlink control information by using the IP address of the terminal.

Optionally, the sending occasion may be time-frequency resource information, for example, time domain resource information and frequency domain resource information; or may be time resource information, for example, a frame number and a subframe number. Correspondingly, the sending occasion may also be time-frequency resource information or time resource information. Specifically, the receiving occasion and the sending occasion may be designed according to an actual use requirement, and are not limited in the present disclosure.

Optionally, the terminal may determine the receiving occasion of receiving the downlink control information according to the identifier of the terminal and a discontinuous reception (DRX) period. The base station may also determine the sending occasion of sending the downlink control information according to the identifier of the terminal and the DRX period.

For example, if the identifier of the terminal is the IP address of the terminal, the terminal may determine the receiving occasion of receiving the downlink control information according to the IP address of the terminal and the DRX period of the terminal; likewise, the base station may also calculate the sending occasion of sending the downlink control information according to the IP address of the terminal and the DRX period of the terminal.

Specifically, in step S805, the base station may send the downlink control information to the terminal by using a PDCCH, so that the terminal may also receive, by listening on the PDCCH, the downlink control information sent from the base station.

Optionally, in the data transmission method provided in this embodiment of the present disclosure, the base station may schedule the terminal by using the identifier of the terminal, for example, the IP address of the terminal. Specifically, the IP address of the terminal is used as an example, and the base station may add the IP address of the terminal into the downlink control information. After the terminal receives the downlink control information, the terminal may determine, according to the IP address of the terminal carried in the downlink control information, whether the downlink control information is sent to the terminal, so that the terminal determines whether to continue to receive the downlink control information, the downlink application layer data packet, or the downlink control information and the downlink application layer data packet. Alternatively, the base station may add the IP address of the terminal into a MAC header of the downlink application layer data packet. The terminal may determine, according to the IP address of the terminal carried in the downlink application layer data packet, whether the downlink application layer data packet is sent to the terminal, so that the terminal determines whether the terminal needs to discard the downlink application layer data packet.

Optionally, to reduce air interface overheads brought when the base station schedules the terminal by using the IP address of the terminal, when the terminal accesses a cell, if the terminal has already stored an IP address allocated by a network side device to the terminal, the terminal may send the IP address of the terminal to the base station, so that the base station schedules the terminal by using the IP address of the terminal or a part of the IP address that is different from that of another terminal.

In the data transmission method provided in this embodiment of the present disclosure, a terminal in an idle state may receive, according to the data transmission indication in the downlink control information sent from the base station, the downlink application layer data packet sent from the base station. Specifically, after the terminal in the idle state receives the downlink control information sent from the base station, the terminal determines, according to the data transmission indication in the downlink control information, that the base station instructs the terminal to receive the downlink application layer data packet sent from the base station. Therefore, the terminal can receive, according to the data transmission indication and on a resource indicated by the downlink control information, the downlink application layer data packet sent from the base station, that is, data transmission can be directly performed between the terminal and the base station.

Specifically, the base station may send the downlink control information to the terminal by using a PDCCH, so that the terminal may also receive, by listening on the PDCCH, the downlink control information sent from the base station.

This embodiment of the present disclosure provides a data transmission method. The method includes: receiving, by a terminal in an idle state, downlink control information sent from a base station, where the downlink control information includes a data transmission indication, and the data transmission indication is used to instruct the terminal to receive a downlink application layer data packet sent from the base station; and receiving, by the terminal according to the data transmission indication, the downlink application layer data packet sent from the base station. Based on the foregoing technical solution, the base station can instruct, according to the data transmission indication, the terminal in the idle state to receive the downlink application layer data packet sent from the base station. Therefore, the terminal can directly receive, according to the data transmission indication, the downlink application layer data packet sent from the base station, thereby initiating data transmission. In this embodiment of the present disclosure, after the terminal initiates data transmission, unlike the prior art in which an RRC connection is frequently established and released during data transmission between the terminal and the base station, a data packet can be directly transmitted between the terminal and the base station, so that data packet transmission efficiency can be improved.

Optionally, the downlink control channel in the embodiment shown in FIG. 12 may be a channel different from a PDCCH in the prior art. For example, the downlink control information (referred to as first downlink control information for short) is sent from using another segment of resource. The other segment of resource is the downlink control channel, and the first downlink control information occupies fewer bits than the downlink control information in the prior art (that is, content of the first downlink control information is less than content of the downlink control information in the prior art). For example, the first downlink control information includes only an identifier of the terminal and/or radio resource information of a downlink data channel.

Optionally, in the embodiment shown in FIG. 12, the downlink application layer data packet may be replaced with a downlink signaling data packet, a downlink MAC layer control packet, or a downlink physical layer sequence. For detailed descriptions and examples of the downlink application layer data packet, the downlink signaling data packet, the downlink MAC layer control packet, and the downlink physical layer sequence, refer to the related descriptions in the SUMMARY part (for details, refer to the related descriptions in some optional manners after the seventh aspect and before the thirteenth aspect of the SUMMARY part), and details are not described herein.

Optionally, in addition to the C-RNTI, the identifier of the terminal in the foregoing embodiment may be the unique X-RNTI, described before Embodiment 1, of the terminal shared in an area of multiple cells. A length of the X-RNTI is greater than that of the C-RNTI, but less than that of a NAS user temporary identifier. For example, the length of the X-RNTI is between 16 bits and 40 bits. Preferably, the length of the X-RNTI is 24 bits.

According to the data transmission method in this embodiment of the present disclosure, because multiple types of data packets (for example, an application layer data packet, a signaling data packet, a MAC layer control packet, and a physical layer sequence) can be transmitted between a terminal in an idle state and a base station, the terminal can more easily and flexibly initiate data transmission. Therefore, a data packet can be directly transmitted between the terminal and the base station more easily and flexibly, and data packet transmission efficiency is improved.

Embodiment 3

Figure 13:
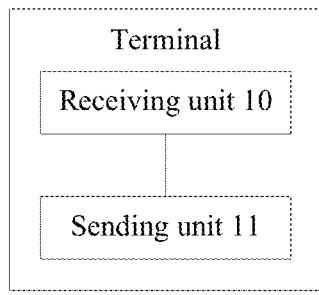
FIG. 13 is a schematic structural diagram 1 of a terminal according to an embodiment of the present disclosure.

As shown in FIG. 13, an embodiment of the present disclosure provides a terminal. The terminal is in an idle state, and the terminal may include a receiving unit 10, configured to receive first resource sent from a base station, where the first resource is used by the terminal to send an uplink application layer data packet to the base station; and a sending unit 11, configured to send, on the first resource received by the receiving unit 10, the uplink application layer data packet to the base station.

Optionally, the sending unit 11 is further configured to, before the receiving unit 10 receives the first resource sent from the base station, send, on access resource, an access sequence to the base station.

The access resource is used to request the base station to allocate the first resource to the terminal; or the access sequence is used to request the base station to allocate the first resource to the terminal.

Figure 14:
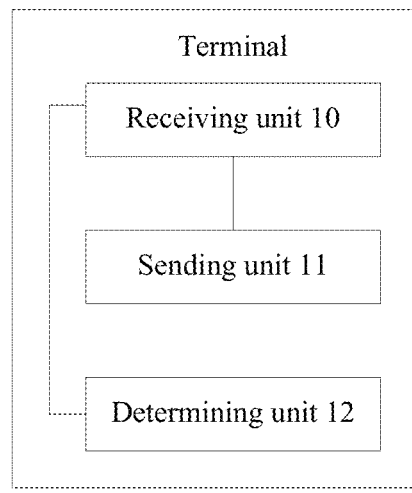
FIG. 14 is a schematic structural diagram 2 of a terminal according to an embodiment of the present disclosure.

Optionally, as shown in FIG. 14, the terminal may further include a determining unit 12.

The receiving unit 10 is further configured to, after the sending unit 11 sends, on the first resource, the uplink application layer data packet to the base station, receive a downlink application layer data packet or downlink control information that is sent from the base station, where the downlink application layer data packet or the downlink control information includes an identifier of a first terminal, and the identifier of the first terminal is used to indicate that the base station successfully receives a first uplink application layer data packet sent from the first terminal; and the determining unit 12 is configured to determine, according to the identifier of the first terminal received by the receiving unit 10, whether the base station successfully receives the uplink application layer data packet sent from the terminal.

Optionally, the sending unit 11 is specifically configured to, when a amount of a to-be-sent data of the terminal is less than or equal to a first threshold, send, on the first resource received by the receiving unit 10, the uplink application layer data packet to the base station; or when a sending interval between to-be-sent uplink application layer data packets of the terminal is greater than or equal to a second threshold, send, on the first resource received by the receiving unit 10, the uplink application layer data packet to the base station.

Optionally, the sending unit 11 is specifically configured to, when a amount of a to-be-sent data of the terminal is less than or equal to a first threshold, send, on the access resource, the access sequence to the base station; or when a sending interval between to-be-sent uplink application layer data packets of the terminal is greater than or equal to a second threshold, send, on the access resource, the access sequence to the base station.

For detailed descriptions of the first resource, the downlink control information, the identifier of the terminal, the access resource, the access sequence, and the like, refer to the related descriptions in Embodiment 1 and Embodiment 2, and details are not described herein.

The terminal provided in this embodiment of the present disclosure may be a terminal device, such as a smartphone, a tablet computer, or a personal digital assistant (PDA).

This embodiment of the present disclosure provides a terminal, and the terminal is in an idle state. When the terminal needs to initiate data transmission, the terminal may send, on first resource that is used to send the uplink application layer data packet and is sent from the base station, an uplink application layer data packet to a base station, thereby initiating data transmission. In this embodiment of the present disclosure, after the terminal initiates data transmission, unlike the prior art in which an RRC connection is frequently established and released during data transmission between the terminal and the base station, a data packet can be directly transmitted between the terminal and the base station, so that data packet transmission efficiency can be improved.

Figure 15:
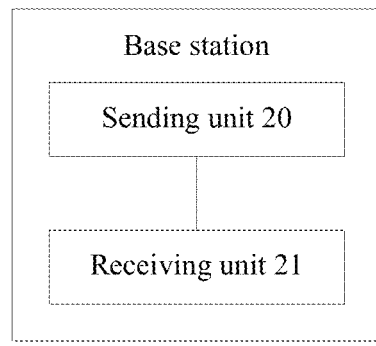
FIG. 15 is a schematic structural diagram 1 of a base station according to an embodiment of the present disclosure.

As shown in FIG. 15, an embodiment of the present disclosure provides a base station, and the base station may include a sending unit 20, configured to send first resource, where the first resource is used by a terminal in an idle state to send an uplink application layer data packet to the base station; and a receiving unit 21, configured to receive, on the first resource sent from the sending unit 20, the uplink application layer data packet sent from the terminal.

Figure 16:
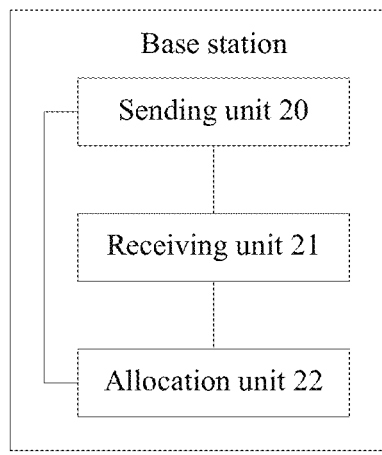
FIG. 16 is a schematic structural diagram 2 of a base station according to an embodiment of the present disclosure.

Optionally, as shown in FIG. 16, the base station may further include an allocation unit 22.

The receiving unit 21 is further configured to, before the sending unit 20 sends the first resource, receive, on access resource, an access sequence sent from the terminal, where the access resource is used to request the base station to allocate the first resource to the terminal, or the access sequence is used to request the base station to allocate the first resource to the terminal; and the allocation unit 22 is configured to allocate the first resource to the terminal according to the access resource on which the receiving unit 21 receives the access sequence or the access sequence received by the receiving unit 21.

Optionally, the sending unit 20 is further configured to, after the receiving unit 21 receives, on the first resource, the uplink application layer data packet sent from the terminal, send a downlink application layer data packet or downlink control information to the terminal, where the downlink application layer data packet or the downlink control information includes an identifier of the terminal, and the identifier of the terminal is used to indicate that the base station successfully receives the uplink application layer data packet sent from the terminal.

For detailed descriptions of the first resource, the downlink control information, the identifier of the terminal, the access resource, the access sequence, and the like, refer to the related descriptions in Embodiment 1 and Embodiment 2, and details are not described herein.

This embodiment of the present disclosure provides a base station. The base station sends first resource used by a terminal in an idle state to send an uplink application layer data packet, and the terminal that needs to initiate data transmission sends, on the first resource, the uplink application layer data packet to the base station, thereby initiating data transmission. In this embodiment of the present disclosure, after the terminal initiates data transmission, unlike the prior art in which an RRC connection is frequently established and released during data transmission between the terminal and the base station, a data packet can be directly transmitted between the terminal and the base station, so that data packet transmission efficiency can be improved.

Optionally, in the embodiments shown in FIG. 13, FIG. 14, FIG. 15, and FIG. 16, the uplink application layer data packet may be replaced with an uplink signaling data packet, an uplink MAC layer control packet, or an uplink physical layer sequence; the downlink application layer data packet or the downlink control information may be replaced with a downlink signaling data packet or a downlink MAC layer control packet; the first uplink application layer data packet may be replaced with a first uplink signaling data packet, a first uplink MAC layer control packet, or a first uplink physical layer sequence; and the to-be-sent uplink application layer data packet may be replaced with a to-be-sent uplink signaling data packet, a to-be-sent uplink MAC layer control packet, or a to-be-sent uplink physical layer sequence.

For detailed descriptions and examples of the uplink application layer data packet, the uplink signaling data packet, the uplink MAC layer control packet, the uplink physical layer sequence, the downlink application layer data packet, the downlink signaling data packet, the downlink MAC layer control packet, and the downlink control information, refer to the related descriptions in the SUMMARY part (for details, refer to the related descriptions in some optional manners before the seventh aspect of the SUMMARY part), and details are not described herein.

According to the data transmission method in this embodiment of the present disclosure, because multiple types of data packets (for example, an application layer data packet, a signaling data packet, a MAC layer control packet, and a physical layer sequence) can be transmitted between a terminal in an idle state and a base station, the terminal can more easily and flexibly initiate data transmission. Therefore, a data packet can be directly transmitted between the terminal and the base station more easily and flexibly, and data packet transmission efficiency is improved.

Figure 17:
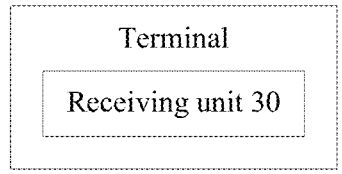
FIG. 17 is a schematic structural diagram 3 of a terminal according to an embodiment of the present disclosure.

As shown in FIG. 17, an embodiment of the present disclosure provides a terminal. The terminal is in an idle state, and the terminal may include a receiving unit 30, configured to, receive downlink control information sent from a base station, where the downlink control information includes a data transmission indication, and the data transmission indication is used to instruct the terminal to receive a downlink application layer data packet sent from the base station; and receive, according to the data transmission indication, the downlink application layer data packet sent from the base station.

Figure 18:
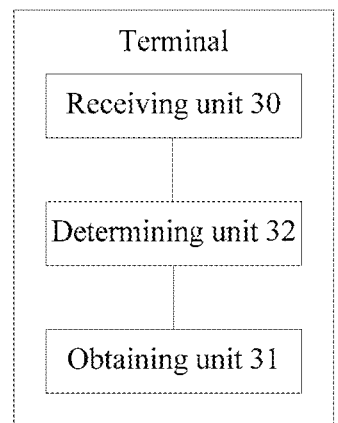
FIG. 18 is a schematic structural diagram 4 of a terminal according to an embodiment of the present disclosure.

Optionally, as shown in FIG. 18, the terminal may further include an obtaining unit 31 and a determining unit 32.

The obtaining unit 31 is configured to obtain an identifier of the terminal before the receiving unit 30 receives the downlink control information sent from the base station, where the identifier of the terminal is used to determine a receiving occasion of receiving the downlink control information, and the identifier of the terminal is at least one of a cell radio network temporary identifier of the terminal or an Internet Protocol address of the terminal; the determining unit 32 is configured to determine the receiving occasion according to the identifier of the terminal obtained by the obtaining unit 31; and the receiving unit 30 is specifically configured to receive, on the receiving occasion determined by the determining unit 32, the downlink control information sent from the base station.

Figure 19:
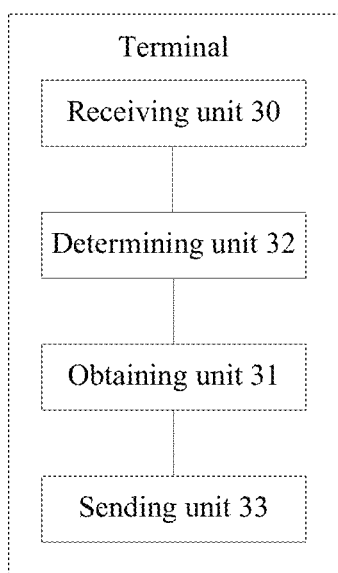
FIG. 19 is a schematic structural diagram 5 of a terminal according to an embodiment of the present disclosure.

Optionally, as shown in FIG. 19, the terminal may further include a sending unit 33.

The sending unit 33 is configured to, after the obtaining unit 31 obtains the identifier of the terminal, before the receiving unit 30 receives the downlink control information sent from the base station, send the identifier of the terminal obtained by the obtaining unit 31 to the base station, where the identifier of the terminal is used by the base station to determine a sending occasion of sending the downlink control information.

The terminal provided in this embodiment of the present disclosure may be a terminal device, such as a smartphone, a tablet computer, or a PDA.

This embodiment of the present disclosure provides a terminal, and the terminal is in an idle state. The terminal may receive a data transmission indication sent from a base station, and directly receive, according to the data transmission indication, a downlink application layer data packet sent from the base station, thereby initiating data transmission. In this embodiment of the present disclosure, after the terminal initiates data transmission, unlike the prior art in which an RRC connection is frequently established and released during data transmission between the terminal and the base station, a data packet can be directly transmitted between the terminal and the base station, so that data packet transmission efficiency can be improved.

Figure 20:
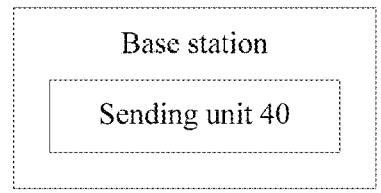
FIG. 20 is a schematic structural diagram 3 of a base station according to an embodiment of the present disclosure.

As shown in FIG. 20, an embodiment of the present disclosure provides a base station, and the base station may include a sending unit 40, configured to, send downlink control information to a terminal in an idle state, where the downlink control information includes a data transmission indication, and the data transmission indication is used to instruct the terminal to receive a downlink application layer data packet sent from the base station; and send the downlink application layer data packet to the terminal.

Figure 21:
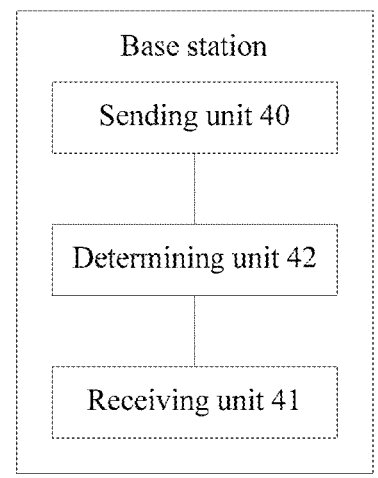
FIG. 21 is a schematic structural diagram 4 of a base station according to an embodiment of the present disclosure.

Optionally, as shown in FIG. 21, the base station may further include a receiving unit 41 and a determining unit 42.

The receiving unit 41 is configured to, before the sending unit 40 sends the downlink control information to the terminal, receive an identifier of the terminal sent from the terminal, where the identifier of the terminal is used to determine a sending occasion of sending the downlink control information, and the identifier of the terminal is at least one of a cell radio network temporary identifier of the terminal or an Internet Protocol address of the terminal; the determining unit 42 is configured to determine the sending occasion according to the identifier of the terminal received by the receiving unit 41; and the sending unit 40 is specifically configured to send, on the sending occasion determined by the determining unit 42, the downlink control information to the terminal.

This embodiment of the present disclosure provides a base station. The base station can instruct, according to a data transmission indication, a terminal in an idle state to receive a downlink application layer data packet sent from the base station. Therefore, the terminal can directly receive, according to the data transmission indication, the downlink application layer data packet sent from the base station, thereby initiating data transmission. In this embodiment of the present disclosure, after the terminal initiates data transmission, unlike the prior art in which an RRC connection is frequently established and released during data transmission between the terminal and the base station, a data packet can be directly transmitted between the terminal and the base station, so that data packet transmission efficiency can be improved.

Optionally, in the embodiments shown in FIG. 17, FIG. 18, FIG. 19, FIG. 20, and FIG. 21, the downlink application layer data packet may be replaced with a downlink signaling data packet, a downlink MAC layer control packet, or a downlink physical layer sequence. For detailed descriptions and examples of the downlink application layer data packet, the downlink signaling data packet, the downlink MAC layer control packet, and the downlink physical layer sequence, refer to the related descriptions in the SUMMARY part (for details, refer to the related descriptions in some optional manners after the seventh aspect and before the thirteenth aspect of the SUMMARY part), and details are not described herein.

According to the data transmission method in this embodiment of the present disclosure, because multiple types of data packets (for example, an application layer data packet, a signaling data packet, a MAC layer control packet, and a physical layer sequence) can be transmitted between a terminal in an idle state and a base station, the terminal can more easily and flexibly initiate data transmission. Therefore, a data packet can be directly transmitted between the terminal and the base station more easily and flexibly, and data packet transmission efficiency is improved.

Embodiment 4

Figure 22:
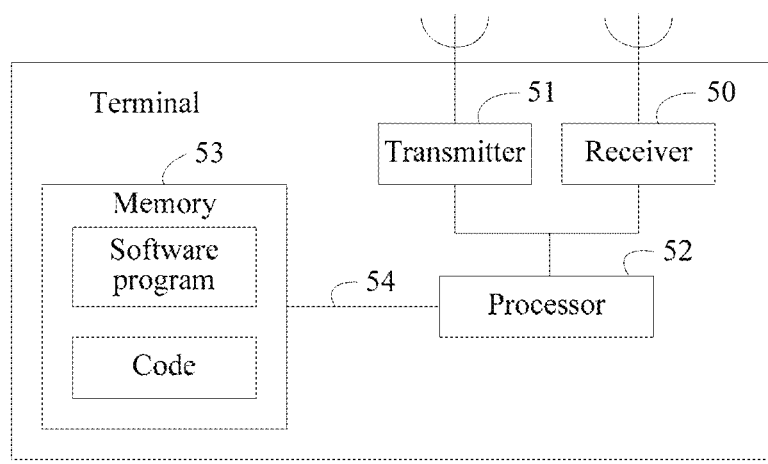
FIG. 22 is a schematic hardware diagram 1 of a terminal according to an embodiment of the present disclosure.

As shown in FIG. 22, an embodiment of the present disclosure provides a terminal. The terminal is in an idle state, and the terminal includes a receiver 50, a transmitter 51, a processor 52, and a memory 53. The receiver 50, the transmitter 51, the processor 52, and the memory 53 connect and communicate with each other by using a system bus 54. The processor 52 may instruct the receiver 50 and the transmitter 51 to execute a related process.

The processor 52 may be a central processing unit (CPU), or an application-specific integrated circuit (ASIC), or one or more integrated circuits configured to implement this embodiment of the present disclosure.

The receiver 50 and the transmitter 51 may be communications interfaces through which the terminal communicates with other devices, for example, may be a radio frequency (RF) module.

The memory 53 may include a volatile memory, for example, a random access memory (RAM); or the memory 53 may include a non-volatile memory, for example, a read-only memory (ROM), a flash memory, a hard disk drive (HDD), or a solid-state drive (SSD); or the memory 53 may include a combination of the foregoing types of memories.

When the terminal operates, the terminal may execute a method procedure shown in FIG. 2 or any one of FIG. 6 to FIG. 11. Specifically, the following may be included the receiver 50 is configured to receive first resource sent from a base station, where the first resource is used by the terminal to send an uplink application layer data packet to the base station; the transmitter 51 is configured to send, on the first resource, the uplink application layer data packet to the base station received by the receiver 50; and the memory 53 is configured to store code of the first resource, code of the uplink application layer data packet, and a software program used by the processor 52 to control the receiver 50 and the transmitter 51 to execute the foregoing process, and the processor 52 invokes the code by executing the software program, to complete the foregoing process.

Optionally, the transmitter 51 is further configured to, before the receiver 50 receives the first resource sent from the base station, send, on access resource, an access sequence to the base station.

The access resource is used to request the base station to allocate the first resource to the terminal; or the access sequence is used to request the base station to allocate the first resource to the terminal.

Optionally, the receiver 50 is further configured to, after the transmitter 51 sends, on the first resource, the uplink application layer data packet to the base station, receive a downlink application layer data packet or downlink control information that is sent from the base station, where the downlink application layer data packet or the downlink control information includes an identifier of a first terminal, and the identifier of the first terminal is used to indicate that the base station successfully receives a first uplink application layer data packet sent from the first terminal; and the processor 52 is further configured to determine, according to the identifier of the first terminal received by the receiver 50, whether the base station successfully receives the uplink application layer data packet sent from the terminal.

Optionally, the transmitter 51 is specifically configured to, when a amount of a to-be-sent data of the terminal is less than or equal to a first threshold, send, on the first resource received by the receiver 50, the uplink application layer data packet to the base station; or when a sending interval between to-be-sent uplink application layer data packets of the terminal is greater than or equal to a second threshold, send, on the first resource received by the receiver 50, the uplink application layer data packet to the base station.

Optionally, the transmitter 51 is specifically configured to, when a amount of a to-be-sent data of the terminal is less than or equal to a first threshold, send, on the access resource, the access sequence to the base station; or when a sending interval between to-be-sent uplink application layer data packets of the terminal is greater than or equal to a second threshold, send, on the access resource, the access sequence to the base station.

For detailed descriptions of the first resource, the downlink control information, the identifier of the terminal, the access resource, the access sequence, and the like, refer to the related descriptions in Embodiment 1 and Embodiment 2, and details are not described herein.

The terminal provided in this embodiment of the present disclosure may be a terminal device, such as a smartphone, a tablet computer, or a PDA.

This embodiment of the present disclosure provides a terminal, and the terminal is in an idle state. When the terminal needs to initiate data transmission, the terminal may send, on first resource that is used to send the uplink application layer data packet and is sent from the base station, an uplink application layer data packet to a base station, thereby initiating data transmission. In this embodiment of the present disclosure, after the terminal initiates data transmission, unlike the prior art in which an RRC connection is frequently established and released during data transmission between the terminal and the base station, a data packet can be directly transmitted between the terminal and the base station, so that data packet transmission efficiency can be improved.

Figure 23:
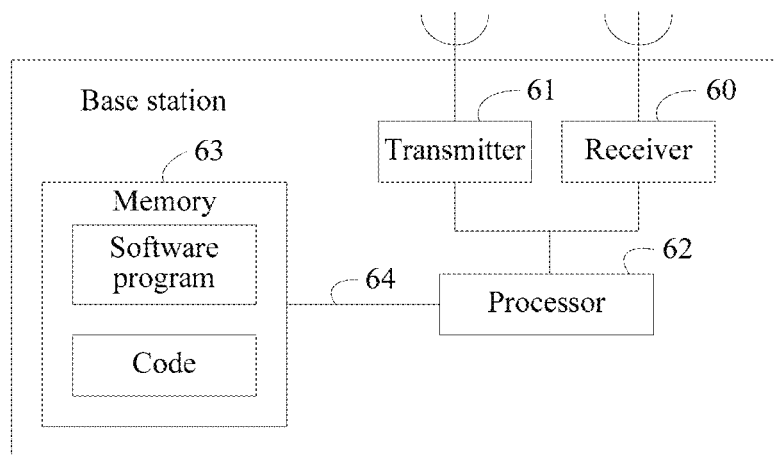
FIG. 23 is a schematic hardware diagram 1 of a base station according to an embodiment of the present disclosure.

As shown in FIG. 23, an embodiment of the present disclosure provides a base station. The base station includes a receiver 60, a transmitter 61, a processor 62, and a memory 63. The receiver 60, the transmitter 61, the processor 62, and the memory 63 connect and communicate with each other by using a system bus 64. The processor 62 may instruct the receiver 60 and the transmitter 61 to execute a related process.

The processor 62 may be a CPU, an ASIC, or one or more integrated circuits configured to implement this embodiment of the present disclosure.

The receiver 60 and the transmitter 61 may be communications interfaces through which the base station communicates with other devices, for example, may be an antenna module.

The memory 63 may include a volatile memory, for example, a RAM; or the memory 63 may include a non-volatile memory, for example, a ROM, a flash memory, an HDD, or an SSD; or the memory 63 may include a combination of the foregoing types of memories.

When the base station operates, the base station may execute a method procedure shown in FIG. 3 or any one of FIG. 6 to FIG. 11. Specifically, the following may be included: the transmitter 61 is configured to send first resource, where the first resource is used by a terminal in an idle state to send an uplink application layer data packet to the base station; the receiver 60 is configured to receive, on the first resource sent from the transmitter 61, the uplink application layer data packet sent from the terminal; and the memory 63 is configured to store code of the first resource, code of the uplink application layer data packet, and a software program used by the processor 62 to control the receiver 60 and the transmitter 61 to execute the foregoing process, and the processor 62 invokes the code by executing the software program, to complete the foregoing process.

Optionally, the receiver 60 is further configured to, before the transmitter 61 sends the first resource, receive, on access resource, an access sequence sent from the terminal, where the access resource is used to request the base station to allocate the first resource to the terminal, or the access sequence is used to request the base station to allocate the first resource to the terminal; and the processor 62 is further configured to allocate the first resource to the terminal according to the access resource on which the receiver 60 receives the access sequence or the access sequence received by the receiver 60.

Optionally, the transmitter 61 is further configured to, after the receiver 60 receives, on the first resource, the uplink application layer data packet sent from the terminal, send a downlink application layer data packet or downlink control information to the terminal, where the downlink application layer data packet or the downlink control information includes an identifier of the terminal, and the identifier of the terminal is used to indicate that the base station successfully receives the uplink application layer data packet sent from the terminal.

For detailed descriptions of the first resource, the downlink control information, the identifier of the terminal, the access resource, the access sequence, and the like, refer to the related descriptions in Embodiment 1 and Embodiment 2, and details are not described herein.

This embodiment of the present disclosure provides a base station. The base station sends first resource used by a terminal in an idle state to send an uplink application layer data packet, and the terminal that needs to initiate data transmission sends, on the first resource, the uplink application layer data packet to the base station, thereby initiating data transmission. In this embodiment of the present disclosure, after the terminal initiates data transmission, unlike the prior art in which an RRC connection is frequently established and released during data transmission between the terminal and the base station, a data packet can be directly transmitted between the terminal and the base station, so that data packet transmission efficiency can be improved.

Optionally, in the embodiments shown in FIG. 22 and FIG. 23, the uplink application layer data packet may be replaced with an uplink signaling data packet, an uplink MAC layer control packet, or an uplink physical layer sequence; the downlink application layer data packet or the downlink control information may be replaced with a downlink signaling data packet or a downlink MAC layer control packet; the first uplink application layer data packet may be replaced with a first uplink signaling data packet, a first uplink MAC layer control packet, or a first uplink physical layer sequence; and the to-be-sent uplink application layer data packet may be replaced with a to-be-sent uplink signaling data packet, a to-be-sent uplink MAC layer control packet, or a to-be-sent uplink physical layer sequence.

For detailed descriptions and examples of the uplink application layer data packet, the uplink signaling data packet, the uplink MAC layer control packet, the uplink physical layer sequence, the downlink application layer data packet, the downlink signaling data packet, the downlink MAC layer control packet, and the downlink control information, refer to the related descriptions in the SUMMARY part (for details, refer to the related descriptions in some optional manners before the seventh aspect of the SUMMARY part), and details are not described herein.

According to the data transmission method in this embodiment of the present disclosure, because multiple types of data packets (for example, an application layer data packet, a signaling data packet, a MAC layer control packet, and a physical layer sequence) can be transmitted between a terminal in an idle state and a base station, the terminal can more easily and flexibly initiate data transmission. Therefore, a data packet can be directly transmitted between the terminal and the base station more easily and flexibly, and data packet transmission efficiency is improved.

Figure 24:
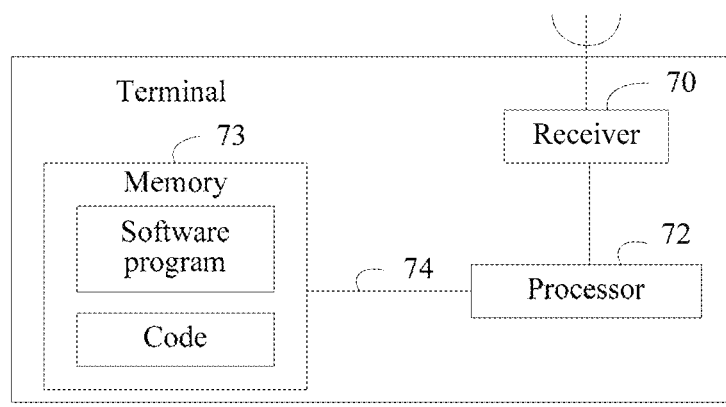
FIG. 24 is a schematic hardware diagram 2 of a terminal according to an embodiment of the present disclosure.

As shown in FIG. 24, an embodiment of the present disclosure provides a terminal. The terminal is in an idle state, and the terminal includes at least a receiver 70, a processor 72, and a memory 73. The receiver 70, the processor 72, and the memory 73 connect and communicate with each other by using a system bus 74.

Figure 25:
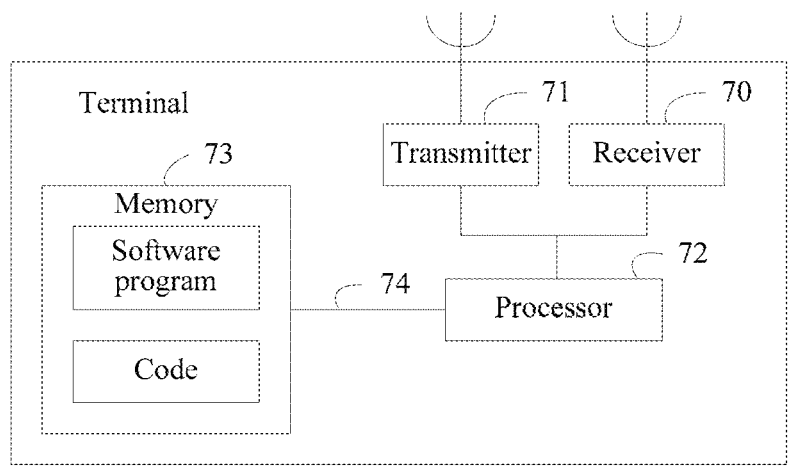
FIG. 25 is a schematic hardware diagram 3 of a terminal according to an embodiment of the present disclosure.

Further, as shown in FIG. 25, the terminal provided in this embodiment of the present disclosure may include a transmitter 71. The transmitter 71 and the processor 72 connect and communicate with each other by using the system bus 74. The processor 72 may instruct the receiver 70 and the transmitter 71 to execute a related process.

For detailed descriptions of the receiver 70, the transmitter 71, the processor 72, and the memory 73, refer to the related descriptions of the receiver 50, the transmitter 51, the processor 52, and the memory 53 in the embodiment shown in FIG. 22, and details are not described herein.

When the terminal operates, the terminal may execute a method procedure shown in FIG. 4 or FIG. 12. Specifically, the following may be included the receiver 70 is configured to, receive downlink control information sent from a base station, where the downlink control information includes a data transmission indication, and the data transmission indication is used to instruct the terminal to receive a downlink application layer data packet sent from the base station; and receive, according to the data transmission indication, the downlink application layer data packet sent from the base station; and the memory 73 is configured to store code of the downlink control information, code of the downlink application layer data packet, and a software program used by the processor 72 to control the receiver 70 to execute the foregoing process, and the processor 72 invokes the code by executing the software program, to complete the foregoing process.

Optionally, the processor 72 is further configured to, obtain an identifier of the terminal before the receiver 70 receives the downlink control information sent from the base station, and determine a receiving occasion of receiving the downlink control information according to the identifier of the terminal, where the identifier of the terminal is used to determine the receiving occasion, and the identifier of the terminal is at least one of a cell radio network temporary identifier of the terminal or an Internet Protocol address of the terminal; and the receiver 70 is specifically configured to receive, on the receiving occasion determined by the processor 72, the downlink control information sent from the base station.

Optionally, the transmitter 71 is configured to, after the processor 72 obtains the identifier of the terminal, before the receiver 70 receives the downlink control information sent from the base station, send the identifier of the terminal obtained by the processor 72 to the base station, where the identifier of the terminal is used by the base station to determine a sending occasion of sending the downlink control information.

For detailed descriptions of the downlink control information, the identifier of the terminal, the sending occasion, the receiving occasion, and the like, refer to the related descriptions in Embodiment 1 and Embodiment 2, and details are not described herein.

The terminal provided in this embodiment of the present disclosure may be a terminal device, such as a smartphone, a tablet computer, or a PDA.

This embodiment of the present disclosure provides a terminal, and the terminal is in an idle state. The terminal may receive a data transmission indication sent from a base station, and directly receive, according to the data transmission indication, a downlink application layer data packet sent from the base station, thereby initiating data transmission. In this embodiment of the present disclosure, after the terminal initiates data transmission, unlike the prior art in which an RRC connection is frequently established and released during data transmission between the terminal and the base station, a data packet can be directly transmitted between the terminal and the base station, so that data packet transmission efficiency can be improved.

Figure 26:
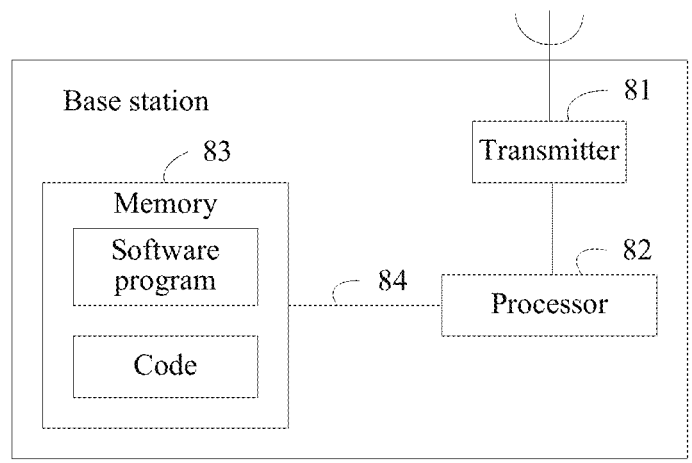
FIG. 26 is a schematic hardware diagram 2 of a base station according to an embodiment of the present disclosure.

As shown in FIG. 26, an embodiment of the present disclosure provides a base station. The base station includes at least a transmitter 81, a processor 82, and a memory 83. The transmitter 81, the processor 82, and the memory 83 connect and communicate with each other by using a system bus 84.

Figure 27:
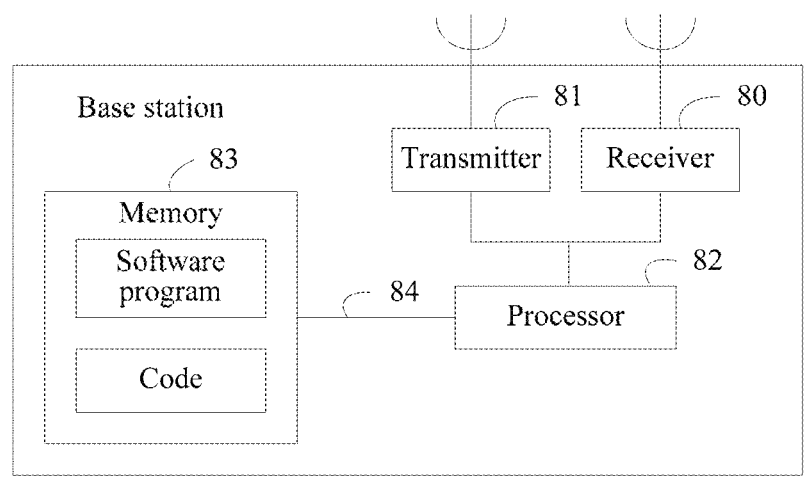
FIG. 27 is a schematic hardware diagram 3 of a base station according to an embodiment of the present disclosure.

Further, as shown in FIG. 27, the base station provided in this embodiment of the present disclosure may include a receiver 80. The receiver 80 and the processor 82 connect and communicate with each other by using the system bus 84. The processor 82 may instruct the receiver 80 and the transmitter 81 to execute a related process.

For detailed descriptions of the receiver 80, the transmitter 81, the processor 82, and the memory 83, refer to the related descriptions of the receiver 60, the transmitter 61, the processor 62, and the memory 63 in the embodiment shown in FIG. 23, and details are not described herein.

When the base station operates, the base station may execute a method procedure shown in FIG. 5 or FIG. 12. Specifically, the following may be included the transmitter 81 is configured to, send downlink control information to a terminal in an idle state, where the downlink control information includes a data transmission indication, and the data transmission indication is used to instruct the terminal to receive a downlink application layer data packet sent from the base station; and send the downlink application layer data packet to the terminal; and the memory 83 is configured to store code of the downlink control information, code of the downlink application layer data packet, and a software program used by the processor 82 to control the transmitter 81 to execute the foregoing process, and the processor 82 invokes the code by executing the software program, to complete the foregoing process.

Optionally, the receiver 80 is configured to, before the transmitter 81 sends the downlink control information to the terminal, receive an identifier of the terminal sent from the terminal, where the identifier of the terminal is used to determine a sending occasion of sending the downlink control information, and the identifier of the terminal is at least one of a cell radio network temporary identifier of the terminal or an Internet Protocol address of the terminal; the processor 82 is further configured to determine the sending occasion according to the identifier of the terminal received by the receiver 80; and the transmitter 81 is specifically configured to send, on the sending occasion determined by the processor 82, the downlink control information to the terminal.

For detailed descriptions of the downlink control information, the identifier of the terminal, the sending occasion, the receiving occasion, and the like, refer to the related descriptions in Embodiment 1 and Embodiment 2, and details are not described herein.

This embodiment of the present disclosure provides a base station. The base station can instruct, according to a data transmission indication, a terminal in an idle state to receive a downlink application layer data packet sent from the base station. Therefore, the terminal can directly receive, according to the data transmission indication, the downlink application layer data packet sent from the base station, thereby initiating data transmission. In this embodiment of the present disclosure, after the terminal initiates data transmission, unlike the prior art in which an RRC connection is frequently established and released during data transmission between the terminal and the base station, a data packet can be directly transmitted between the terminal and the base station, so that data packet transmission efficiency can be improved.

Optionally, in the embodiments shown in FIG. 24, FIG. 25, FIG. 26, and FIG. 27, the downlink application layer data packet may be replaced with a downlink signaling data packet, a downlink MAC layer control packet, or a downlink physical layer sequence. For detailed descriptions and examples of the downlink application layer data packet, the downlink signaling data packet, the downlink MAC layer control packet, and the downlink physical layer sequence, refer to the related descriptions in the SUMMARY part (for details, refer to the related descriptions in some optional manners after the seventh aspect and before the thirteenth aspect of the SUMMARY part), and details are not described herein.

According to the data transmission method in this embodiment of the present disclosure, because multiple types of data packets (for example, an application layer data packet, a signaling data packet, a MAC layer control packet, and a physical layer sequence) can be transmitted between a terminal in an idle state and a base station, the terminal can more easily and flexibly initiate data transmission. Therefore, a data packet can be directly transmitted between the terminal and the base station more easily and flexibly, and data packet transmission efficiency is improved.

Embodiment 5

An embodiment of the present disclosure provides a data transmission system. As shown in FIG. 1, the data transmission system may include a terminal and a base station. The data transmission system may be an M2M system.

The terminal provided in this embodiment of the present disclosure may be a terminal device, such as a smartphone, a tablet computer, or a PDA.

In the data transmission system provided in this embodiment of the present disclosure, the terminal may be the terminal described in FIG. 13 or FIG. 14 in Embodiment 3, and the base station may be the base station described in FIG. 15 and FIG. 16 in Embodiment 3. Specifically, for descriptions of the terminal and the base station, refer to the related descriptions in Embodiment 3, and details are not described herein.

Alternatively, the terminal may be the terminal described in FIG. 22 in Embodiment 4, and the base station may be the base station described in FIG. 23 in Embodiment 4. Specifically, for descriptions of the terminal and the base station, refer to the related descriptions in Embodiment 4, and details are not described herein.

This embodiment of the present disclosure provides a data transmission system. When a terminal in an idle state needs to initiate data transmission, the terminal may send, on first resource that is used to send the uplink application layer data packet and is sent from the base station, an uplink application layer data packet to a base station, thereby initiating data transmission. In this embodiment of the present disclosure, after the terminal initiates data transmission, unlike the prior art in which an RRC connection is frequently established and released during data transmission between the terminal and the base station, a data packet can be directly transmitted between the terminal and the base station, so that data packet transmission efficiency can be improved.

Optionally, in this embodiment, the uplink application layer data packet may be replaced with an uplink signaling data packet, an uplink MAC layer control packet, or an uplink physical layer sequence; the downlink application layer data packet or the downlink control information may be replaced with a downlink signaling data packet or a downlink MAC layer control packet; the first uplink application layer data packet may be replaced with a first uplink signaling data packet, a first uplink MAC layer control packet, or a first uplink physical layer sequence; and the to-be-sent uplink application layer data packet may be replaced with a to-be-sent uplink signaling data packet, a to-be-sent uplink MAC layer control packet, or a to-be-sent uplink physical layer sequence.

For detailed descriptions and examples of the uplink application layer data packet, the uplink signaling data packet, the uplink MAC layer control packet, the uplink physical layer sequence, the downlink application layer data packet, the downlink signaling data packet, the downlink MAC layer control packet, and the downlink control information, refer to the related descriptions in the SUMMARY part (for details, refer to the related descriptions in some optional manners before the seventh aspect of the SUMMARY part), and details are not described herein.

According to the data transmission method in this embodiment of the present disclosure, because multiple types of data packets (for example, an application layer data packet, a signaling data packet, a MAC layer control packet, and a physical layer sequence) can be transmitted between a terminal in an idle state and a base station, the terminal can more easily and flexibly initiate data transmission. Therefore, a data packet can be directly transmitted between the terminal and the base station more easily and flexibly, and data packet transmission efficiency is improved.

In another data transmission system provided in this embodiment of the present disclosure, the terminal may be the terminal described in any one of FIG. 17 to FIG. 19 in Embodiment 3, and the base station may be the base station described in FIG. 20 and FIG. 21 in Embodiment 3. Specifically, for descriptions of the terminal and the base station, refer to the related descriptions in Embodiment 3, and details are not described herein.

Alternatively, the terminal may be the terminal described in FIG. 24 or FIG. 25 in Embodiment 4, and the base station may be the base station described in FIG. 26 or FIG. 27 in Embodiment 4. Specifically, for descriptions of the terminal and the base station, refer to the related descriptions in Embodiment 4, and details are not described herein.

This embodiment of the present disclosure provides a data transmission system. A base station can instruct, according to a data transmission indication, a terminal in an idle state to receive a downlink application layer data packet sent from the base station. Therefore, the terminal can directly receive, according to the data transmission indication, the downlink application layer data packet sent from the base station, thereby initiating data transmission. In this embodiment of the present disclosure, after the terminal initiates data transmission, unlike the prior art in which an RRC connection is frequently established and released during data transmission between the terminal and the base station, a data packet can be directly transmitted between the terminal and the base station, so that data packet transmission efficiency can be improved.

Optionally, in this embodiment, the downlink application layer data packet may be replaced with a downlink signaling data packet, a downlink MAC layer control packet, or a downlink physical layer sequence. For detailed descriptions and examples of the downlink application layer data packet, the downlink signaling data packet, the downlink MAC layer control packet, and the downlink physical layer sequence, refer to the related descriptions in the SUMMARY part (for details, refer to the related descriptions in some optional manners after the seventh aspect and before the thirteenth aspect of the SUMMARY part), and details are not described herein.

According to the data transmission method in this embodiment of the present disclosure, because multiple types of data packets (for example, an application layer data packet, a signaling data packet, a MAC layer control packet, and a physical layer sequence) can be transmitted between a terminal in an idle state and a base station, the terminal can more easily and flexibly initiate data transmission. Therefore, a data packet can be directly transmitted between the terminal and the base station more easily and flexibly, and data packet transmission efficiency is improved.

It may be clearly understood by a person skilled in the art that, for the purpose of convenient and brief description, division of the foregoing functional modules is taken as an example for illustration. In actual application, the foregoing functions can be allocated to different functional modules and implemented according to a requirement, that is, an inner structure of an apparatus is divided into different functional modules to implement all or some of the functions described above. For a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or some of the technical solutions may be implemented in the form of a software product. The software product is stored in a storage medium and includes several instructions for instructing a computer device (which may be a personal computer, a server, or a network device) or a processor to perform all or some of the steps of the methods described in the embodiments of the present disclosure. The foregoing storage medium includes any medium that can store program code, such as a USB flash drive, a removable hard disk, a ROM, a RAM, a magnetic disk, or an optical disc.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. An apparatus for transmitting data, the apparatus comprising:
   a transmitter, configured to: in a case that the apparatus does not have a Radio Resource Control (RRC) connection with a base station, send an access sequence representing of a request for a first resource in response to determining that an amount of a to-be-sent data of the apparatus is less than or equal to a first threshold, wherein the first resource is used by the apparatus to send an uplink application layer data packet to the base station; and
   a receiver, configured to receive an indication from the base station, wherein the indication instructs the apparatus to obtain a resource for transmission of the uplink application layer data packet via an RRC connection setup procedure.

2. The apparatus according to claim 1, wherein the receiver is further configured to:
   receive a downlink application layer data packet, a downlink signaling data packet, a downlink MAC layer control packet, or downlink control information that is sent from the base station, after the transmitter sends, on the first resource, the uplink application layer data packet to the base station, wherein the downlink application layer data packet, the downlink signaling data packet, the downlink MAC layer control packet, or the downlink control information comprises an identifier of the apparatus for indicating that the base station successfully receives the uplink application layer data packet.

3. The apparatus according to claim 1, wherein:
   the transmitter is configured to, when the amount of a to-be-sent data of the apparatus is less than or equal to the first threshold, send, on the first resource, the uplink application layer data packet to the base station.

4. The apparatus according to of claim 1, wherein the receiver is further configured to receive a duration of the first resource that can be used by the apparatus from the base station.

5. The apparatus according to of claim 1, wherein the receiver is configured to receive a system broadcast message comprising the first resource or a dedicated message comprising the first resource sent from the base station.

6. A terminal, comprising:
   a transmitter, configured to: in a case that the terminal does not have a Radio Resource Control (RRC) connection with a base station, send an access sequence representing of a request for a first resource in response to determining that an amount of a to-be-sent data of the terminal is less than or equal to a first threshold, wherein the first resource is used by the terminal to send an uplink application layer data packet to the base station; and a receiver, configured to receive an indication from the base station, wherein the indication instructs the terminal to obtain a resource for transmission of the uplink application layer data packet via an RRC connection setup procedure.

7. The terminal according to claim 6, wherein:

the receiver is further configured to: after the transmitter sends, on the first resource, the uplink application layer data packet the base station, receive a downlink application layer data packet, a downlink signaling data packet, a downlink MAC layer control packet, or downlink control information that is sent from the base station, wherein the downlink application layer data packet, the downlink signaling data packet, the downlink MAC layer control packet, or the downlink control information comprises an identifier of the terminal; and the terminal further comprises a processor configured to determine, according to the identifier of the terminal, that the base station successfully receives the uplink application layer data packet.

8. The terminal according to claim 6, wherein the transmitter is configured to:

when the amount of a to-be-sent data of the terminal is less than or equal to the first threshold, send, on the first resource, the uplink application layer data packet to the base station.

9. The terminal according to claim 6, wherein the receiver is further configured to receive a duration of the first resource from the base station.

10. The terminal according to claim 6, wherein the receiver is configured to receive a system broadcast message comprising the first resource or a dedicated message comprising the first resource sent from the base station.

11. A base station, comprising:

a transmitter, configured to send a first resource to a terminal, while the terminal does not have a Radio Resource Control (RRC) connection with the base station; and a receiver, configured to receive, on the first resource sent from the transmitter, an uplink application layer data packet, an uplink signaling data packet, an uplink media access control (MAC) layer control packet, or an uplink physical layer sequence that is sent from the terminal, wherein the amount of the uplink application layer data packet, the uplink signaling data packet, the uplink media access control (MAC) layer control packet, or the uplink physical layer sequence is less than or equal to a first threshold, while the terminal does not have the RRC connection with the base station.

12. The base station according to claim 11, wherein:

the receiver is further configured to: before the transmitter sends the first resource, receive, on access resource, an access sequence sent from the terminal for requesting the base station to allocate the first resource to the terminal; and the base station further comprises a processor configured to allocate the first resource to the terminal according to the access sequence.

13. The base station according to claim 11, wherein the transmitter is further configured to:

send a downlink application layer data packet, a downlink signaling data packet, a downlink MAC layer control packet, or downlink control information to the terminal, after the receiver receives the uplink application layer data packet, the uplink signaling data packet, the uplink MAC layer control packet, or the uplink physical layer sequence that is sent from the terminal on the first resource, wherein the downlink application layer data packet, the downlink signaling data packet, the downlink MAC layer control packet, or the downlink control information comprises an identifier of the terminal for indicating that the base station successfully receives the uplink application layer data packet, the uplink signaling data packet, the uplink MAC layer control packet, or the uplink physical layer sequence that is sent from the terminal.

14. The base station according to claim 11, wherein the transmitter is further configured to send a duration of the first resource that can be used by the terminal to the terminal.

15. The base station according to claim 11, wherein the transmitter is configured to send a system broadcast message comprising the first resource or a dedicated message comprising the first resource to the terminal.

* * * * *

UNITED STATES PATENT AND TRADEMARK OFFICE
CERTIFICATE OF CORRECTION

PATENT NO.      : 10,813,147 B2
APPLICATION NO. : 15/795050
DATED           : October 20, 2020
INVENTOR(S)     : Xiaoying Xu et al.

It is certified that error appears in the above-identified patent and that said Letters Patent is hereby corrected as shown below:

In the Claims

In Column 50, Line 53, in Claim 4, delete "to of" and insert -- to --, therefor.

In Column 50, Line 57, in Claim 5, delete "to of" and insert -- to --, therefor.

Signed and Sealed this
Twenty-third Day of March, 2021

Drew Hirshfeld
*Performing the Functions and Duties of the*
*Under Secretary of Commerce for Intellectual Property and*
*Director of the United States Patent and Trademark Office*